US008583052B2

(12) United States Patent
Noguchi et al.

(10) Patent No.: US 8,583,052 B2
(45) Date of Patent: Nov. 12, 2013

(54) WIRELESS COMMUNICATION APPARATUS CHANGING RADIATION PATTERNS OF ANTENNA APPARATUSES

(75) Inventors: Wataru Noguchi, Hyogo (JP); Toyoshi Yamada, Osaka (JP); Hiroyuki Yurugi, Osaka (JP); Osamu Tanaka, Osaka (JP); Nobuhiko Arashin, Osaka (JP); Masahiko Nagoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 156 days.

(21) Appl. No.: 13/387,526

(22) PCT Filed: Nov. 29, 2010

(86) PCT No.: PCT/JP2010/006936
§ 371 (c)(1),
(2), (4) Date: Jan. 27, 2012

(87) PCT Pub. No.: WO2011/065020
PCT Pub. Date: Jun. 3, 2011

(65) Prior Publication Data
US 2012/0122414 A1    May 17, 2012

(30) Foreign Application Priority Data

Nov. 27, 2009 (JP) .................................. 2009-270295

(51) Int. Cl.
*H04B 17/00* (2006.01)
(52) U.S. Cl.
USPC ..................................... 455/67.11; 455/226.1
(58) Field of Classification Search
USPC ........ 455/67.11, 67.13, 523, 271, 114.1, 317, 455/226.1, 226.3, 115.1, 115.3
See application file for complete search history.

(56) References Cited

U.S. PATENT DOCUMENTS

| 7,221,963 B2 | 5/2007 | Ishihara et al. |
| 2005/0181755 A1 | 8/2005 | Hoshino et al. |

FOREIGN PATENT DOCUMENTS

| GB | 2 347 591 | 9/2000 |
| JP | 4-68720 | 3/1992 |
| JP | 8-172423 | 7/1996 |
| JP | 9-148973 | 6/1997 |
| JP | 10-242894 | 9/1998 |
| JP | 2000-134023 | 5/2000 |
| JP | 2000-196512 | 7/2000 |
| JP | 2003-174389 | 6/2003 |
| JP | 2005-142866 | 6/2005 |
| JP | 2008-160532 | 7/2008 |
| JP | 2009-135729 | 6/2009 |
| JP | 2010-258579 | 11/2010 |

OTHER PUBLICATIONS

International Preliminary Report on Patentability issued Jul. 19, 2012 in International (PCT) Application No. PCT/JP2010/006936.
International Search Report issued Feb. 22, 2011 in International (PCT) Application No. PCT/JP2010/006936.

*Primary Examiner* — Eugene Yun
(74) *Attorney, Agent, or Firm* — Wenderoth, Lind & Ponack, L.L.P.

(57) ABSTRACT

When controlling antenna apparatuses to select a predetermined combination from among a plurality of combinations of antenna elements, a controller measures RSSIs of wireless signals received by the antenna apparatuses, and sets a detection packet interval and a changeover threshold based on measured RSSIs with reference to a detection packet interval table and a changeover threshold table. Then, the combination of the antenna elements is changed over by using the set detection packet interval and the changeover threshold.

12 Claims, 14 Drawing Sheets

Fig.2

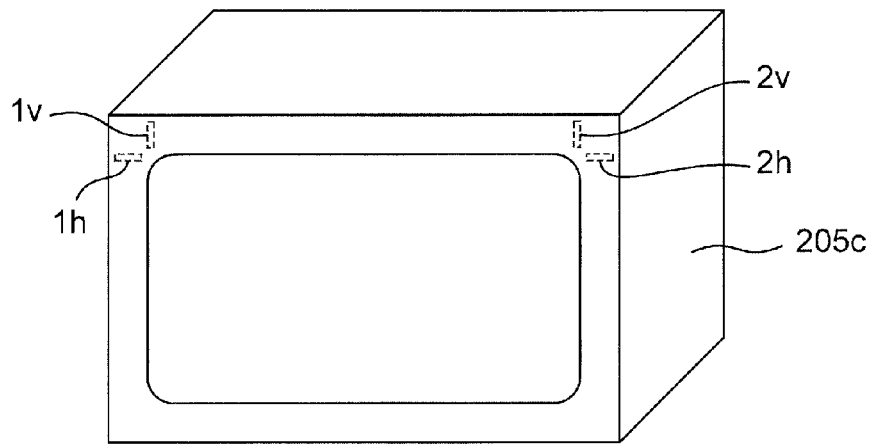

Fig.3

DETECTION PACKET INTERVAL TABLE T1

| | | VALUE OF ELECTRIC FIELD PARAMETER P2 (dBm) | | | |
|---|---|---|---|---|---|
| | | EQUAL TO OR LARGER THAN 100 | EQUAL TO OR LARGER THAN 50 AND SMALLER THAN 100 | EQUAL TO OR LARGER THAN 20 AND SMALLER THAN 50 | SMALLER THAN 20 |
| VALUE OF ELECTRIC FIELD PARAMETER P1 (dBm) | EQUAL TO OR LARGER THAN −700 (INTENSE ELECTRIC FIELD) | 100 | 50 | 20 | 10 |
| | SMALLER THAN −700 (WEAK ELECTRIC FIELD) | 200 | 100 | 40 | 20 |

Fig.4

CHANGEOVER THRESHOLD TABLE T2

| | | VALUE OF ELECTRIC FIELD PARAMETER P2 (dBm) | | | |
|---|---|---|---|---|---|
| | | EQUAL TO OR LARGER THAN 100 | EQUAL TO OR LARGER THAN 50 AND SMALLER THAN 100 | EQUAL TO OR LARGER THAN 20 AND SMALLER THAN 50 | SMALLER THAN 20 |
| VALUE OF ELECTRIC FIELD PARAMETER P1 (dBm) | EQUAL TO OR LARGER THAN −700 (INTENSE ELECTRIC FIELD) | 50 | 25 | 10 | 5 |
| | SMALLER THAN −700 (WEAK ELECTRIC FIELD) | 100 | 50 | 25 | 10 |

ANTENNA COMBINATION TABLE T3

| ANTENNA COMBINATION | C1 (INTIAL SETTING) | C2 | C3 | C4 |
|---|---|---|---|---|
| SELECTED ANTENNA ELEMENTS | 1v AND 2v | 1v AND 2h | 1h AND 2v | 1h AND 2h |

Fig. 14

RADIATION PATTERN TABLE T4

| RADIATION PATTERN GROUP | RADIATION PATTERN SUBGROUP | RADIATION PATTERN COMBINATION (PARASITIC ELEMENTS TO BE TURNED ON) | | | |
|---|---|---|---|---|---|
| G1 | A1 | A(1,1) (1b,2a) | A(1,2) (1b) | A(1,3) (1b, 2a, 2b) | A(1,4) (1b,2b) |
| | B1 | B(1,1) (1b,2a) | B(1,2) (2a) | B(1,3) (1a,1b,2a) | B(1,4) (1a, 2a) |
| G2 | A2 | A(2,1) (1a, 2b) | A(2,2) (1a) | A(2,3) (1a, 2a, 2b) | A(2,4) (1a, 2a) |
| | B2 | B(2,1) (1a, 2b) | B(2,2) (2b) | B(2,3) (1a, 1b, 2b) | B(2,4) (1b, 2b) |
| G3 | A3 | A(3,1) (NOTHING) | A(3,2) (2a, 2b) | A(3,3) (2a) | A(3,4) (2b) |
| | B3 | B(3,1) (NOTHING) | B(3,2) (1a,1b) | B(3,3) (1a) | B(3,4) (1b) |
| G4 | A4 | A(4,1) (1a, 1b, 2a, 2b) | A(4,2) (1a, 1b, 2a) | A(4,3) (1a, 1b, 2b) | A(4,4) (1a, 1b) |
| | B4 | B(4,1) (1a, 1b, 2a, 2b) | B(4,2) (1a, 2a, 2b) | B(4,3) (1b, 2a, 2b) | B(4,4) (2a, 2b) |

Fig. 15

| RADIATION PATTERN SELECTING PROCESS PARAMETER TABLE T5 | | ELECTRIC FIELD PARAMETER Rmax (dBm) | |
|---|---|---|---|
| | | LARGER THAN −71 (INTENSE ELECTRIC FIELD) | EQUAL TO OR SMALLER THAN −71 (WEAK ELECTRIC FIELD) |
| RADIATION PATTERN SELECTION PROCESS PARAMETERS USED IN RADIATION PATTERN GROUP SELECTION PROCESS OF FIG. 17 | CHANGEOVER THRESHOLD RECEIVED ELECTRIC FIELD THg (dBm) | −68 | −73 |
| | CHANGEOVER THRESHOLD Ncg | 10 | 10 |
| | DETECTION PACKET INTERVAL Mpg | 50 | 50 |
| RADIATION PATTERN SELECTION PROCESS PARAMETERS USED IN RADIATION PATTERN SUBGROUP SELECTION PROCESS OF FIG. 18 | CHANGEOVER THRESHOLD RECEIVED ELECTRIC FIELD THs (dBm) | −71 | −76 |
| | CHANGEOVER THRESHOLD Ncs | 50 | 50 |
| | DETECTION PACKET INTERVAL Mps | 250 | 250 |

WIRELESS COMMUNICATION APPARATUS CHANGING RADIATION PATTERNS OF ANTENNA APPARATUSES

TECHNICAL FIELD

The present invention relates to wireless communication apparatuses each having a plurality of antenna apparatuses. In particular, the present invention relates to wireless communication apparatuses that change radiation patterns of respective antenna apparatuses thereof according to variation in a radio wave propagation environment.

BACKGROUND ART

Among network configurations in which information terminals are mutually connected, a wireless network that uses wireless communications has advantages over a wire network that uses wire communications in the following points. The wireless network has portability and the degree of freedom in the arrangement of the information terminals higher than those of the wire network, and can reduce the weights of the information terminals by removing wired cables. Thus, wireless communication apparatuses have been not only utilized for data transmission between conventional personal computers but also currently mounted in a lot of home electric appliances, and the wireless communication is utilized for video and audio data transmission among the home electric appliances.

The wireless communication apparatuses has the above-described advantages, however, sometimes failed in normally transmitting data due to deterioration in the transmission characteristics under the influence of fading caused by delay waves that arrive after being reflected on objects when the wireless communication apparatuses are placed in a space where a number of reflective objects are placed, since the wireless communication apparatuses communicate with each other by radiating electromagnetic waves in the space. For example, when an Internet Video on Demand (VoD: Video on Demand) technology is utilized by using fixedly installed home electric appliances, such as a large-sized television broadcasting receiver apparatus, a Blu-ray Disc recording and reproducing apparatus or a DVD recorder, it is required to mount a function of connection to a wireless LAN (Local Area Network) on each of the home electric appliances and to provide a wireless LAN access point for connection to an Internet line. In this case, the fading is mainly caused by the movement of a human being who exists in the periphery of the television broadcasting receiver apparatus or the DVD recorder, and opening and closing of doors. In addition, when wireless communication apparatuses that are mounted in portable equipments such as a small-sized television broadcasting receiver apparatus such as a one-segment television broadcasting receiver apparatus, a portable DVD player or the like, and a wireless access point communicate with each other, the fading is mainly caused when the equipments are moved.

Conventionally, as measures against such fading, there have been proposed control methods such as directivity control and a variety of diversity processing of transceiving antennas. For example, the Patent Documents 1 to 3 disclose prior art wireless communication apparatuses that receive wireless signals according to time-lapse changes in the radio wave propagation environment.

CITATION LIST

Patent Document

Patent Document 1: Japanese Patent Laid-open Publication No. 2000-134023 A;
Patent Document 2: Japanese Patent Laid-open Publication No. 2005-142866 A; and
Patent Document 3: Japanese Patent Laid-open Publication No. 8-172423 A.

SUMMARY OF INVENTION

Technical Problem

It is possible to suppress decrease in a transmission rate itself due to fading phenomena by using a control method such as the prior art selective diversity processing. However, when setting values of control parameters for executing directivity control or diversity processing of transceiving antennas are inappropriate, unnecessary antenna control has occurred, and this led to a decreased throughput.

It is an object of the present invention to provide a wireless communication apparatus capable of solving the aforementioned problems and capable of changing the radiation patterns of a plurality of antenna apparatuses according to variation in a radio wave propagation environment more efficiently than the prior art.

Solution to Problem

A wireless communication apparatus according to a first invention includes:
a first antenna apparatus that has a plurality of first radiation patterns different from each other;
a second antenna apparatus that has a plurality of second radiation patterns different from each other; and
control means that sets radiation patterns of the first and second antenna apparatuses by changing over the radiation patterns of the first and second antenna apparatuses, respectively,
When the control means sets the first and second antenna apparatuses to have predetermined radiation patterns, respectively, the control means measures a first received signal level of a wireless signal received by the first antenna apparatus and a second received signal level of a wireless signal received by the second antenna apparatus. Based on measured first and second received signal levels, the control means sets a detection time interval of received electric field at the wireless communication apparatus so that the detection time interval decreases with an increase in the received electric field and increases with an increase in a time-lapse change in the received electric field, and sets a changeover threshold of each of the radiation patterns so that the changeover threshold decreases with the increase in the received electric field and increases with the increase in the time-lapse change in the received electric field. The control means calculates a linear combined value of the first and second received signal levels every set detection time interval, and controls the first and second antenna apparatus to have a further radiation pattern combination when the control means successively detects by a set changeover threshold that a calculated linear combined value is equal to or smaller than a predetermined value.

The above-described antenna apparatus further includes storage means that previously stores a first table that includes setting values of the detection time interval to change in the received electric field and change in the time-lapse change in the received electric field, and a second table that includes setting values of the changeover threshold to the change in the received electric field and the change in the time-lapse change in the received electric field. The received electric field is a sum total of measurement values when the control means simultaneously measures the first and second received signal levels by a predetermined first number of times. The time-lapse change in the received electric field is an absolute value of a difference between a sum total of measurement values when the control means simultaneously measures the first and second received signal levels by a predetermined second number of times, and a sum total of measurement values when the control means simultaneously further measures the first and second received signal levels by the predetermined second number of times. The control means measures the first and second received signal levels when the control means set the first and second antenna apparatuses to have the predetermined radiation patterns, respectively. The control means calculates the received electric field and the time-lapse change in the received electric field based on measured first and second received signal levels. Based on calculated values of the received electric field and the time-lapse change in the received electric field, the control means sets the detection time interval with reference to the first table, and sets the changeover threshold with reference to the second table.

In addition, in the above-described wireless communication apparatus, the linear combined value is an average value of the measurement values of the first and second received signal levels.

A wireless communication apparatus according to a second invention includes:

a first antenna apparatus that has a plurality of first radiation patterns different from each other;

a second antenna apparatus that has a plurality of second radiation patterns different from each other; and control means that sets radiation patterns of the first and second antenna apparatuses by changing over the radiation patterns of the first and second antenna apparatuses, respectively When the control means sets the first and second antenna apparatuses to have predetermined radiation patterns, respectively, the control means measures a first received signal level of a wireless signal received by the first antenna apparatus and a second received signal level of a wireless signal received by the second antenna apparatus. Based on measured first and second received signal levels, the control means sets a first changeover threshold received electric field for each of the radiation patterns so that the first changeover threshold received electric field increases with an increase in received electric field at the wireless communication apparatus. The control means measures the first and second received signal levels every predetermined first detection time interval, and controls the first and second antenna apparatus to have a further radiation pattern combination when the control means successively detects by a predetermined first changeover threshold that at least one of measured first and second received signal levels is equal to or smaller than a set first changeover threshold received electric field.

The above-described wireless communication apparatus further includes storage means that previously stores:

(a) a first table including setting values of the first changeover threshold received electric field to change in the received electric field; and (b) a second table configured by classifying a plurality of radiation pattern combinations of the plurality of first radiation patterns and the plurality of second radiation patterns into a plurality of radiation pattern groups considering directivity characteristics of combined radiation patterns.

The received electric field is a larger measurement value of simultaneously measured measurement values of the first and second received signal levels. The control means calculates the received electric field based on measured first and second received signal levels when the control means sets the first and second antenna apparatuses to have the predetermined radiation patterns, respectively, and sets the first changeover threshold received electric field with reference to the first table based on a calculated value of the received electric field. When the control means selects one combination of the plurality of combinations of radiation patterns and controls the first and second antenna apparatuses to be set to have the one combination, the control means measures the first and second received signal levels every first detection time interval. The control means (a) retains a selected radiation pattern combination;

(b) selects a predetermined radiation pattern combination, which is included in a radiation pattern group other than a radiation pattern group that includes the selected radiation pattern combination, with reference to the second table, when the control means successively detects by the first changeover threshold that the measured first and second received signal levels are equal to or smaller than the set first changeover threshold received electric field; and (c) by executing a predetermined selection process, selects a further radiation pattern combination, which is included in the radiation pattern group that includes the selected radiation pattern combination, with reference to the second table, when the control means successively detects by the first changeover threshold that one of the measured first and second received signal levels is smaller than the first changeover threshold received electric field.

In addition, in the above-described wireless communication apparatus, each of the radiation pattern groups includes first and second radiation pattern subgroups. In each of the radiation pattern groups, first radiation patterns included in the radiation pattern combinations included in the first radiation pattern subgroup are the same as each other, and second radiation patterns included in the radiation pattern combinations included in the first radiation pattern subgroup are different from each other. In each of the radiation pattern groups, first radiation patterns included in the radiation pattern combinations included in the second radiation pattern subgroup are different from each other, and second radiation patterns included in the radiation pattern combinations included in the second radiation pattern subgroup are the same as each other. The selection process includes:

(c1) when the measured first received signal level is equal to or larger than the second received signal level, selecting a first radiation pattern combination, which is included in the first radiation pattern subgroup that includes the selected radiation pattern combination and is different from the selected radiation pattern combination, with reference to the second table; and (c2) when the measured first received signal level is smaller than the second received signal level, selecting a second radiation pattern combination, which is included in the second radiation pattern subgroup that includes the selected radiation pattern combination and is different from the selected radiation pattern combination, with reference to the second table.

Further, in the above-described wireless communication apparatus, the first table further includes setting values of the second changeover threshold received electric field to the change in the received electric field. When the control means sets the first changeover threshold received electric field with reference to the first table, the control means further sets the second changeover threshold received electric field with reference to the first table, based on the calculated received electric field. The selection process includes measuring the first and second received signal levels every predetermined second detection time interval, and selecting the first or second radiation pattern combination when the control means successively detects by a predetermined second changeover threshold that at least one of measured first and second received signal levels is equal to or smaller than a set second changeover threshold received electric field.

Still further, in the above-described wireless communication apparatus, in the first table, the plurality of setting values of the first changeover threshold received electric field are set to increase with an increase in the received electric field, the plurality of setting values of the second changeover threshold received electric field are set to increase with the increase in the received electric field, and the setting values of the first changeover threshold received electric field are set to values larger than the setting values of corresponding second changeover threshold received electric field, respectively. The first changeover threshold is set to have a value smaller than the second changeover threshold. The first detection time interval is set to have a value smaller than the second detection time interval.

In addition, in the above-described wireless communication apparatus, the first antenna apparatus includes:

a plurality of first antenna elements that has a plurality of respective first radiation patterns that are different from each other, respectively; and first changeover means that selects one antenna element from among the plurality of first antenna elements by selectively changing over a selected first antenna element.

The second antenna apparatus includes:

a plurality of second antenna elements having a plurality of respective second radiation patterns that are different from each other, respectively; and second changeover means for selecting one antenna element from among the plurality of second antenna elements by selectively changing over a selected second antenna element.

Further, in the above-described wireless communication apparatus, the first antenna apparatus includes:

a first feed element;

two first parasitic elements that are provided in proximity to the first feed element so as to be electromagnetically coupled to the first feed element; and first radiation pattern control means that selects one radiation pattern from among the plurality of first radiation patterns different from each other by changing over a selected first radiation pattern by changing over whether or not to operate the first parasitic elements as reflectors, respectively.

The second antenna apparatus includes:

a second feed element, two second parasitic elements that are provided in proximity to the second feed element so as to be electromagnetically coupled to the second feed element; and second radiation pattern control means that selects one radiation pattern from among the plurality of second radiation patterns different from each other by changing over a selected second radiation pattern by changing over whether or not to operate the second parasitic elements as reflectors, respectively.

Advantageous Effects of Invention

According to the wireless communication apparatus of the first the present invention, when the control means sets the first and second antenna apparatuses to have predetermined radiation patterns, respectively, the control means measures a first received signal level of a wireless signal received by the first antenna apparatus and a second received signal level of a wireless signal received by the second antenna apparatus. Based on measured first and second received signal levels, the control means sets a detection time interval of received electric field at the wireless communication apparatus so that the detection time interval decreases with an increase in the received electric field and increases with an increase in a time-lapse change in the received electric field, and sets a changeover threshold of each of the radiation patterns so that the changeover threshold decreases with the increase in the received electric field and increases with the increase in the time-lapse change in the received electric field. Therefore, it is possible to change the radiation patterns of the plurality of antenna apparatuses according to variation in the radio wave propagation environment more efficiently than the prior art.

In addition, according to the wireless communication apparatus of the second the present invention, the control means sets the first and second antenna apparatuses to have predetermined radiation patterns, respectively, the control means measures a first received signal level of a wireless signal received by the first antenna apparatus and a second received signal level of a wireless signal received by the second antenna apparatus. Based on measured first and second received signal levels, the control means sets a first changeover threshold received electric field for each of the radiation patterns so that the first changeover threshold received electric field increases with an increase in received electric field at the wireless communication apparatus. Therefore, it is possible to change the radiation patterns of the plurality of antenna apparatuses according to variation in the radio wave propagation environment more efficiently than the prior art.

BRIEF DESCRIPTION OF DRAWINGS

FIG. 2 is a perspective view of a monitor apparatus 205 of FIG. 1;

FIG. 3 is a table showing a detection packet interval table T1 of FIG. 1;

FIG. 4 is a table showing a changeover threshold table T2 of FIG. 1;

FIG. 13B is a graph showing a radiation pattern of the array antenna apparatus 1 when only the parasitic element 1b of FIG. 11 is turned on;

FIG. 13C is a graph showing a radiation pattern of the array antenna apparatus 1 when the parasitic elements 1a and 1b of FIG. 11 are turned on;

FIG. 13D is a graph showing a radiation pattern of the array antenna apparatus 1 when only the parasitic element 1a of FIG. 11 is turned on;

FIG. 14 is a table showing a radiation pattern table T4 of FIG. 8;

FIG. 15 is a table showing the radiation pattern selection process parameter table T5 of FIG. 8;

DESCRIPTION OF EMBODIMENTS

Figure 1:
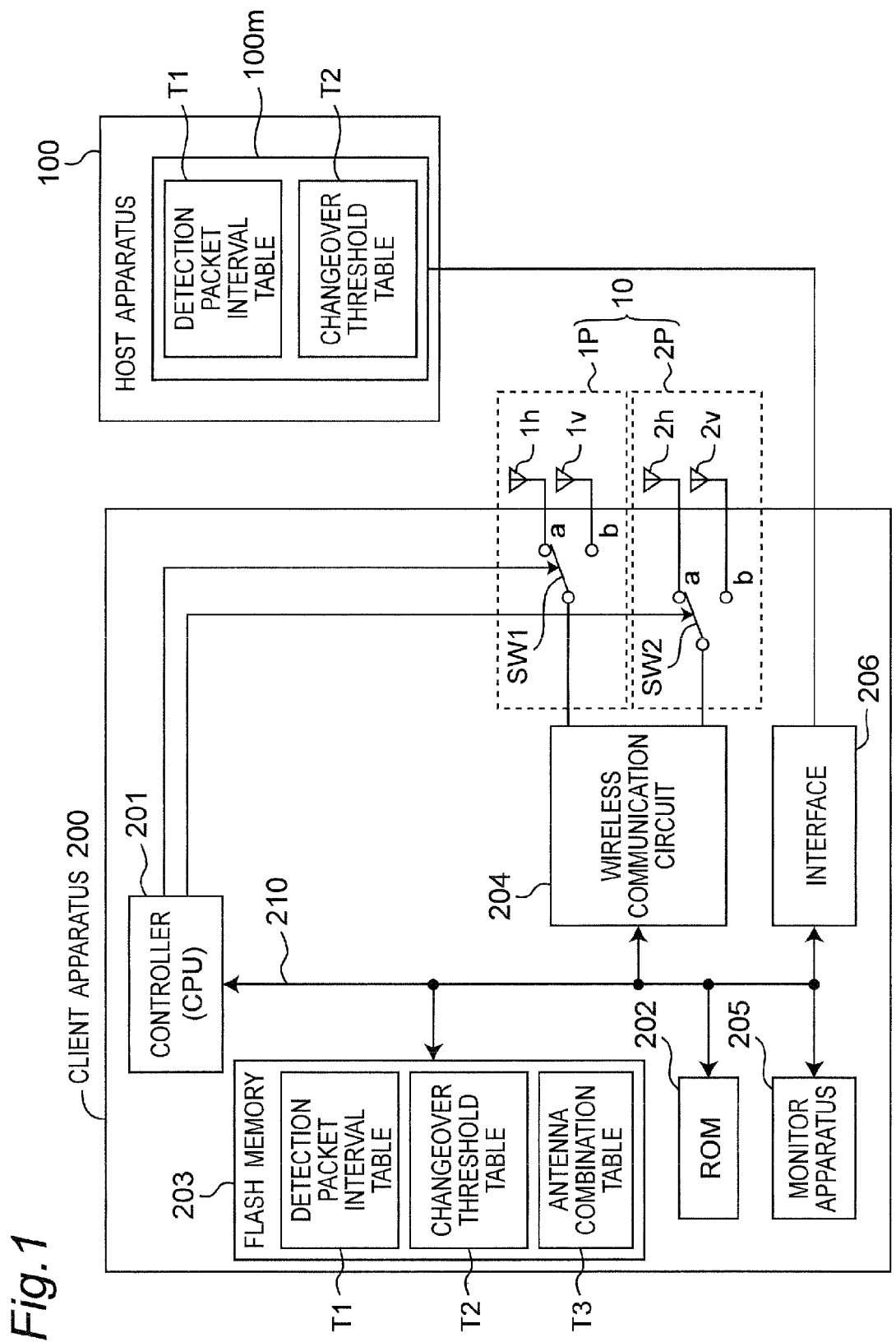
FIG. 1 is a block diagram showing a configuration of a client apparatus 200 according to a first preferred embodiment of the present invention.

Preferred embodiments according to the present invention will be described below with reference to the attached drawings. In the following preferred embodiments, components similar to each other are denoted by the same reference numerals.

First Preferred Embodiment

Figure 5:
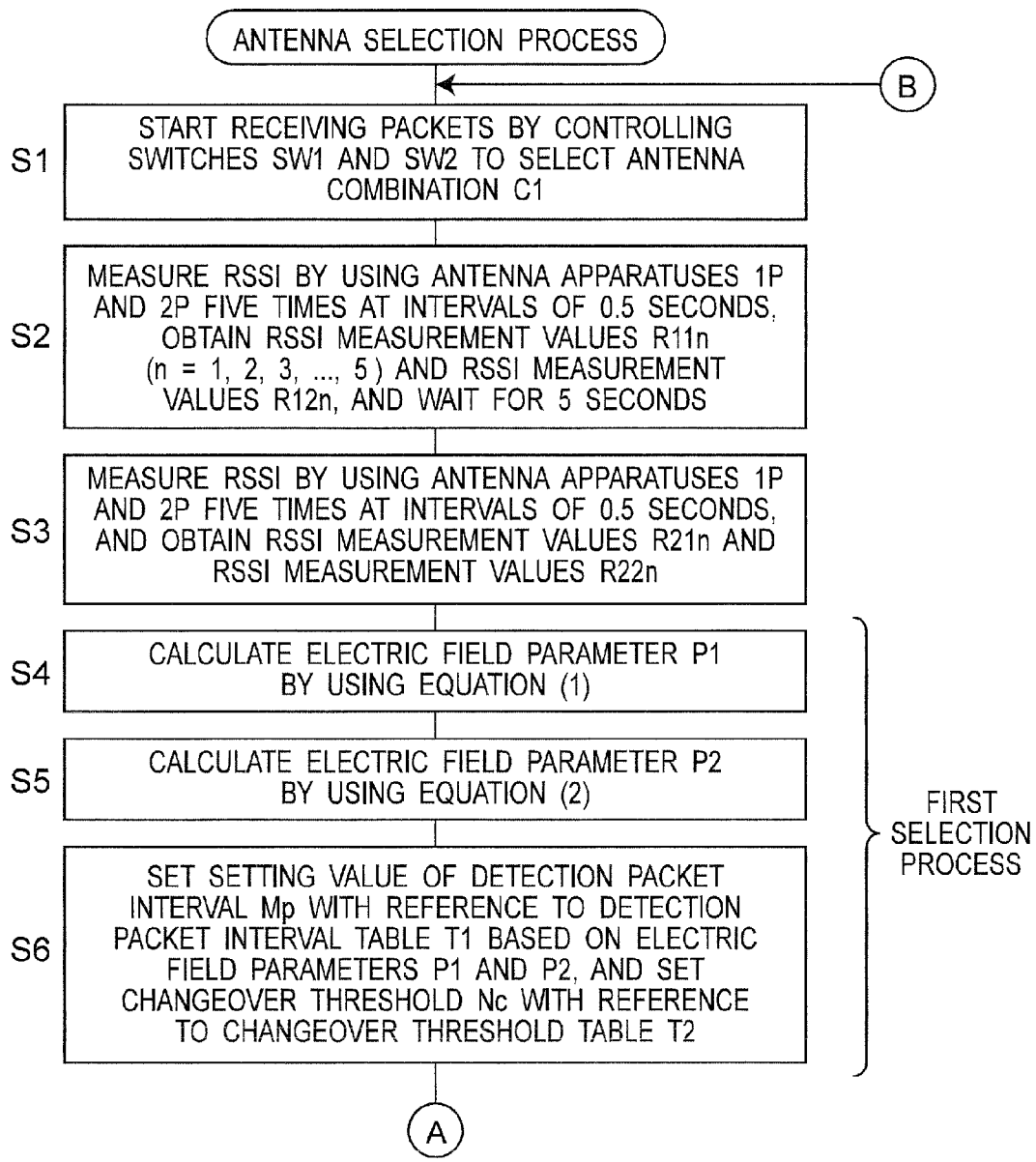
FIG. 5 is a flow chart showing a first part of an antenna selection process executed by a controller 201 of FIG. 1.
Figure 6:
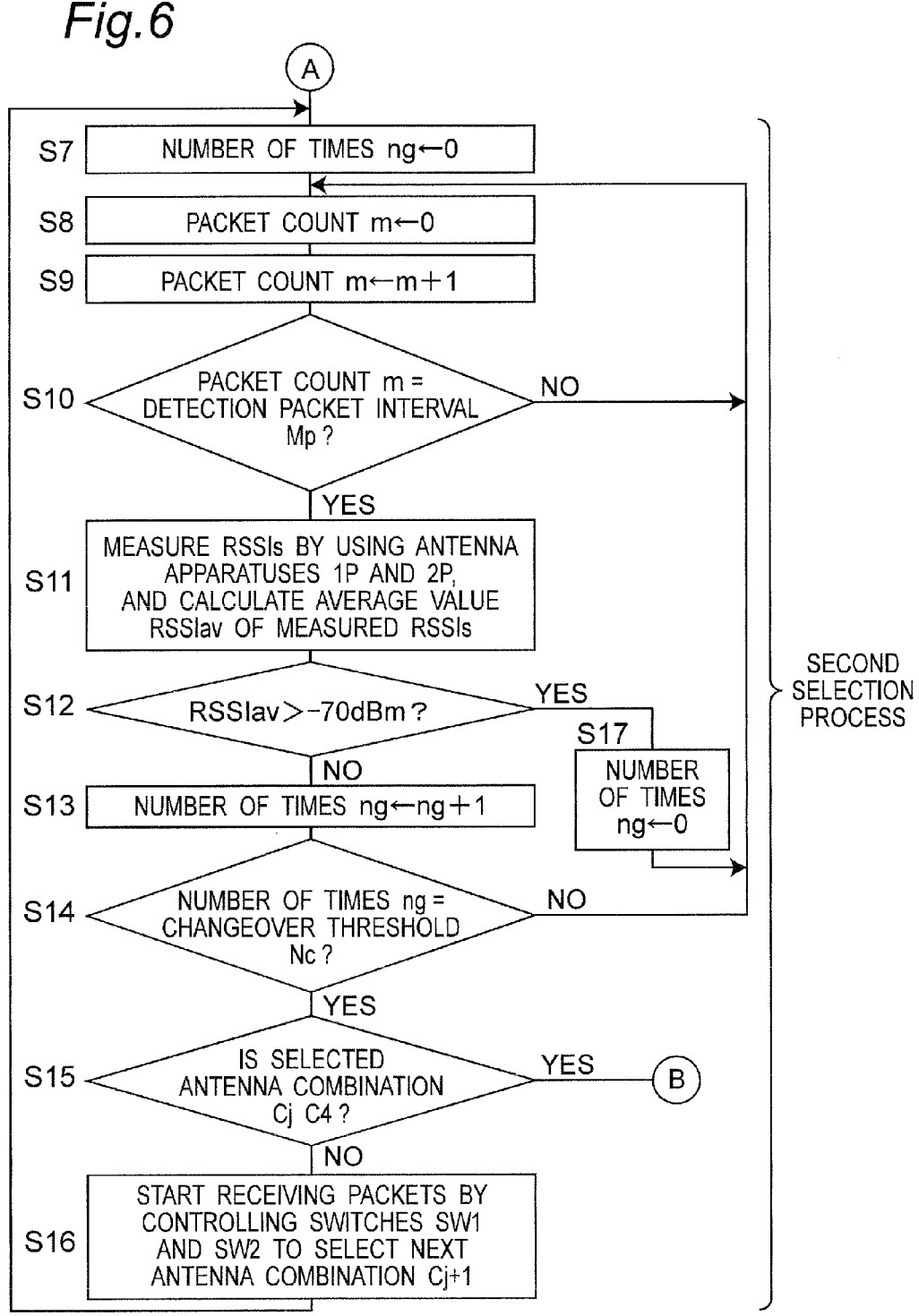
FIG. 6 is a flow chart showing a second part of the antenna selection process executed by the controller 201 of FIG. 1.
Figures 7, 8:
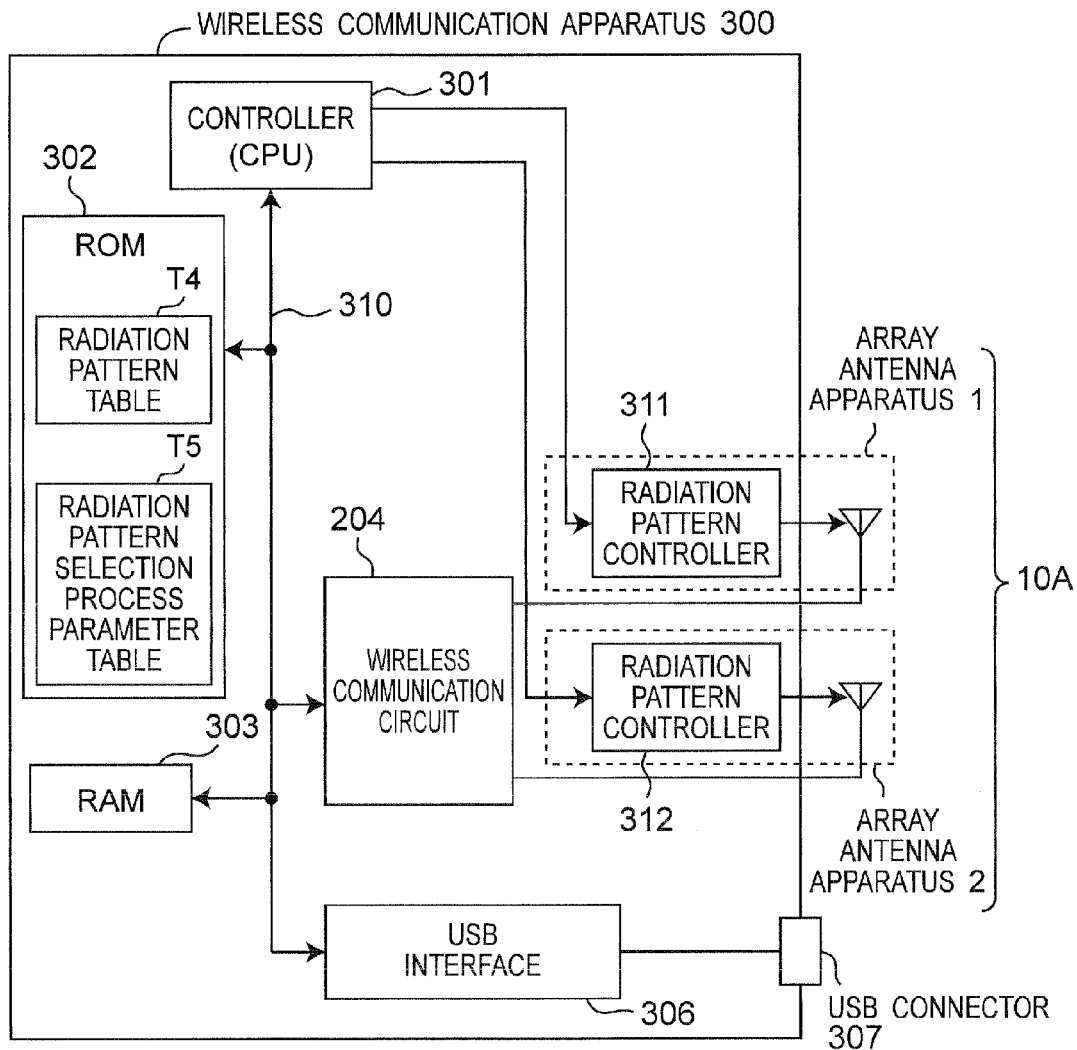
FIG. 7 is a table showing an antenna combination table T3 of FIG. 1.
FIG. 8 is a block diagram showing a configuration of a wireless communication apparatus 300 according to a second preferred embodiment of the present invention.

FIG. 1 is a block diagram showing a configuration of a client apparatus 200 according to the first preferred embodiment of the present invention, and FIG. 2 is a perspective view of a monitor apparatus 205 of FIG. 1. FIG. 3 is a table showing a detection packet interval table T1 of FIG. 1, and FIG. 4 is a table showing a changeover threshold table T2 of FIG. 1. Further, FIGS. 5 and 6 are flow charts showing an antenna selection process Executed by a controller 201 of FIG. 1. FIG. 7 is a table showing an antenna combination table T3 of FIG. 1, and showing a relation between antenna combinations selected by the controller 201 of FIG. 1 and antenna elements selected in each of the antenna combinations.

As described in detail later, the client apparatus 200 of the present preferred embodiment is a wireless communication apparatus configured to include the followings:

(a) an antenna apparatus 1P including antenna elements 1$v$ and 1$h$ for receiving radio waves of vertically polarized waves and horizontally polarized waves, respectively, and a switch SW1 for selecting one antenna element from among the antenna elopements 1$v$ and 1$h$ by selectively changing over a selected first antenna element.

(b) an antenna apparatus 2P including antenna elements 2$v$ and 2$h$ for receiving radio waves of vertically polarized waves and horizontally polarized waves, respectively, and a switch SW2 for selecting one antenna element from among the antenna elopements 2$v$ and 2$h$ by selectively changing over a selected first antenna element.

(c) a flash memory 203 for previously storing a detection packet interval table T1 (also referred to as an RSSI measurement packet interval table T1) and a changeover threshold table T2 (also referred to as a count value threshold value table T2). The detection packet interval table T1 includes setting values of a detection packet interval (also referred to as an RSSI measurement packet interval) Mp of a selection process parameter, to respective setting values of electric field parameters P1 and P2 calculated by using measurement values R11$n$ ($n$=1, 2, ..., 5) and R21$n$ of RSSI (Received Signal Strength Indicator) representing a received signal level of a wireless signal received by the antenna apparatus 1P, and RSSI measurement values R12$n$ and R22$n$ representing a received signal level of a wireless signal received by the antenna apparatus 2P. The changeover threshold table T2 includes setting values of a changeover threshold Nc (also referred to as a count value threshold value) of a selection process parameter, to setting values of the electric field parameters P1 and P2.

(d) a controller 201 for setting radiation patterns of the antenna apparatuses 1P and 2P by changing over the radiation patterns of the antenna apparatuses 1P and 2P, respectively.

In this case, when the controller 201 sets the antenna apparatuses 1P and 2P so as to select the antenna element 1$v$ in the antenna apparatus 1P and to select the antenna element 2$v$ in the antenna apparatus 2P, the to controller 201 measures the measurement values R11$n$ R21$n$, R12$n$ and R22$n$ of the received signal levels of the wireless signals received by the antenna apparatuses 1P and 2P. Based on the measurement values R11$n$ R21$n$, R12$n$ and R22$n$, the controller 201 sets the detection packet interval Mp corresponding to the detection time interval of the received electric field at the client apparatus 200 so that the detection packet interval Mp decreases with an increase in the received electric field and increases with an increase in a time-lapse change in the received electric field, and sets, and sets the changeover threshold Nc of the radiation patterns so that the changeover threshold Nc decreases with the increase in the received electric field and increases with the increase in the time-lapse change in the received electric field. The controller 201 is further characterized by calculating an average value RSSIav of the RSSIs of the wireless signal received by the antenna apparatus 1P and the RSSIs of the wireless signal received by the antenna apparatus 2P every detection packet interval set as described above, and controlling the antenna apparatuses 1P and 2P to have a further radiation pattern combination when the controller 201 successively detects by a set changeover threshold Nc that the average value RSSIav is equal to or smaller than a predetermined value.

The controller 201 is further characterized by measuring the RSSI measurement values R11$n$, R21$n$, R12$n$ and R22$n$ (steps S1 to S3), calculating the electric field parameters P1 and P2 based on the RSSI measurement values R11$n$ R21$n$, R12$n$ and R22$n$ (steps S4 and S5), setting the detection packet interval Mp based on calculated values of the electric field parameters P1 and P2 with reference to the detection packet interval table T1, setting the changeover threshold Nc based on calculated values of the electric field parameters P1 and P2 with reference to the changeover threshold table T2 (step S6), and selecting one combination from among the plurality of antenna combinations of FIG. 7 by using the second selection process of FIG. 6 based on a selected detection packet interval Mp and a selected changeover threshold Nc, when the controller 201 selects an antenna combination C1 (See FIG. 7) from among the plurality of antenna combinations of the antenna elements 1V and 1$h$ and controls the antenna apparatuses 1P and 2P to be set to have the antenna combination C1.

The configuration and operation of the client apparatus 200 of the present preferred embodiment are concretely described below. Referring to FIG. 1, the client apparatus 200 is a wireless communication apparatus of a 2×2 MIMO (Multiple-Input Multiple-Output) transmission system conforming to the wireless LAN communication standard IEEE802.11n. The client apparatus 200 is provided for each seat in an aircraft, and establishes wireless communications with other client apparatuses 200 and an access point (not shown) in the aircraft. The client apparatus 200 is connected to a host apparatus 100 by using a predetermined connection interface at the time of manufacture of the client apparatus 200. The client apparatus 200 is configured to include the controller 201, a ROM (Read Only Memory) 202, the nonvolatile flash memory 203, a wireless communication circuit 204, a monitor apparatus 205, an interface 206, an antenna unit 10 including the antenna apparatuses 1P and 2P, and a bus 210.

In this case, the antenna apparatus 1P is a polarization diversity antenna apparatus, and is configured to include the antenna element $1h$ for receiving radio waves of horizontally polarized waves, the antenna element $1v$ for receiving radio waves of vertically polarized waves, and the switch SW1 for connecting one antenna element of the antenna elements $1h$ and $1v$ to the wireless communication circuit 204. In addition, the antenna apparatus 2P is a polarization diversity antenna apparatus, and is configured to include the antenna element $2h$ for receiving radio waves of horizontally polarized waves, the antenna element $2v$ for receiving radio waves of vertically polarized waves, and the switch SW1 for connection of one antenna element of the antenna elements $2h$ and $2v$ to the wireless communication circuit 204. Namely, each of the antenna apparatuses 1P and 2P has two radiation patterns different from each other. In addition, as shown in FIG. 2, the antenna elements $1h$ and $1v$ are monopole antennas embedded in the upper left corner of a resin-made casing $205c$ of the monitor apparatus 205, and the antenna elements $2h$ and $2v$ are monopole antennas embedded in the upper right corner of the casing 205 of the monitor apparatus 205.

Referring to FIG. 1, concretely speaking, the controller 201 is configured by a CPU (Central Processing Unit), and is connected to the ROM 202, the flash memory 203, the wireless communication circuit 204, the monitor apparatus 205, and the interface 206 via the bus 210 to control them. In addition, the controller 201 executes various software functions. Further, the controller 201 performs changeover of the switches SW1 and SW2 in the antenna selection process described in detail later with reference to FIG. 5. The monitor apparatus 205 is a display apparatus such as a liquid crystal display (LCD (Liquid Crystal Display)) apparatus or a CRT (Cathode Ray Tube) display apparatus to display operating state of the client apparatus 200, and to display received video data. The ROM 202 previously stores various software programs, which are required for the operation of the client apparatus 200 and are executed by the controller 201, and the antenna selection process program of FIG. 5. In addition, the flash memory 203 is used as a working area of the controller 201 to store temporary data generated at the time of executing the programs, and also stores the detection packet interval table T1, the changeover threshold table T2 and the antenna combination table T3, which are described in detail later. Further, by executing predetermined interface processes of signal conversion, protocol conversion and so on, the interface 206 receives signals and data from the host apparatus 100, and transmits signals and data to the host apparatus 100.

In addition, referring to FIG. 1, the wireless communication circuit 204 is configured to include a high-frequency processing circuit to process the wireless signal from the antenna apparatus 1P, a high-frequency processing circuit to process the wireless signal from the antenna apparatus 2P, a baseband processing circuit, and a MAC (Media Access Control) processing circuit. Each of the high frequency processing circuits is configured to include a high-frequency bandpass filter to execute a predetermined bandpass process on an inputted wireless signal, a low-noise amplifier to amplify the wireless signal obtained after the bandpass process, a demodulator of a direct conversion system to directly demodulate an amplified wireless signal into a baseband signal, and a baseband filter to execute a predetermined bandpass process on the baseband signal. Further, the baseband processing circuit has two AGC (Automatic Gain Control) circuits to control signal levels of the baseband signals inputted from the two high-frequency processing circuits so that the signal levels become substantially constant, and a MIMO decoder circuit to generate a decoded signal by executing a MIMO decoding process of the baseband signals from the AGC circuits and to output a resultant signal to the MAC processing circuit. In this case, the baseband processing circuit calculates the RSSIs (Received Signal Strength Indicators), that represent the received signal levels of the wireless signals of the respective baseband signal, based on each AGC voltage of a control voltage outputted from each AGC circuit by using preamble data of the data packet at the time of receiving each data packet, and outputs calculated RSSIs to the controller 201. In addition, based on data packets included in the decoded signal from the baseband processing circuit, the MAC processing circuit judges whether or not the data packets are directed to the client apparatus 200, and thereafter, executes predetermined MAC processing on the decoded signal from the baseband processing circuit when the data packets are directed to the client apparatus 200, and outputs a resultant signal to the controller 201.

Referring to FIG. 1, at the time of manufacture of the client apparatus 200, the controller 201 reads out the detection packet interval table T1 and the changeover threshold table T2, which have been stored in a memory 100 m of the host apparatus 100, and stores the detection packet interval table T1 and the changeover threshold table T2 into the flash memory 203. It is noted that the antenna combination table T3 is previously stored in the flash memory 203. When executing the antenna selection process of FIGS. 5 and 6, the controller 201 selects one of the antenna combinations C1 to C4 of FIG. 7 with reference to the detection packet interval table T1 and the changeover threshold table T2 stored in the flash memory 203 based the RSSI measurement values for the antenna apparatuses 1P and 2P outputted from the wireless communication circuit 204, and controls the switches SW1 and SW2 to changeover to antennas of a selected antenna combination. As shown in FIG. 7, the antenna elements $1v$ and $2v$ are selected in the antenna combination C1, and the antenna elements $1v$ and $2h$ are selected in the antenna combination C2. The antenna elements $1h$ and $2v$ are selected in the antenna combination C3, and the antenna elements $1h$ and $2h$ are selected in the antenna combination C4. It is noted that the antenna combinations C1 to C4 have higher priorities in the order of the antenna combinations C1, C2, C3 and C4, and the controller 201 performs changeover of the antenna combination according to the priorities with reference to the antenna combination table T3.

Next, the antenna selection process executed by the controller 201 is described. Referring to FIG. 5, first of all, at step S1, the controller 201 controls the wireless communication circuit 204 to select the antenna combination C1 that has the highest priority among the antenna combinations C1 to C4 by changing over the switch SW1 to the contact "b" thereof and changing over the switch SW2 to the contact "b" thereof with reference to the antenna combination table T3, and control the wireless communication circuit 204 to start receiving packets. Then, at step S2, the controller measures RSSI by using the antenna apparatuses 1P and 2P five times at 0.5 second intervals, obtains the RSSI measurement values $R11n$ ($n=1, 2, \ldots, 5$) for the wireless signal received by the antenna apparatus 1P and the RSSI measurement values $R12n$ for the wireless signal received by the antenna apparatus 2P, and controls the wireless communication circuit 204 to wait for five seconds. Further, at step S3, the controller measures the RSSI by using the antenna apparatuses 1P and 2P five times at 0.5 second intervals, and controls the wireless communication circuit 204 to obtain the RSSI measurement values R21n for the wireless signal received by the antenna apparatus 1P and the RSSI measurement values R22n for the wireless signal received by the antenna apparatus 2P.

Next, at step S4, the controller 201 calculates the electric field parameter P1 by using the following Equation (1):

$$P1 = \sum_{n=1}^{5} (R11n + R12n + R21n + R22n). \quad (1)$$

Further, at step S5, the controller 201 calculates the electric field parameter P2 by using the following Equation (2):

$$P2 = \left| \sum_{n=1}^{5} (R11n + R12n) - \sum_{n=1}^{5} (R21n + R22n) \right|. \quad (2)$$

In this case, as expressed in the Equation (1), the electric field parameter P1 is a sum total of the RSSI measurement values R11n, R12n, R21n and R22n measured when the RSSIs for the antenna apparatuses 1P and 2P are measured ten times simultaneously. The electric field parameter P1 represents the strength of the received electric field at the client apparatus 200. The electric field parameter P2 is the absolute value of a difference to between a sum total of the RSSI measurement values R11n and R12n measured when the RSSIs of the antenna apparatuses 1P and 2P are measured simultaneously five times and a sum total of the RSSI measurement values R21n and R22n measured when the RSSIs of the antenna apparatuses 1P and 2P are measured five times simultaneously. The electric field parameter P2 represents a magnitude of the time-lapse change in the received electric field at the client apparatus 200.

Next, at step S6, the controller 201 sets the setting value of the detection packet interval Mp with reference to the detection packet interval table T1 based on the calculated electric field parameters P1 and P2, and sets the setting value of the changeover threshold Nc with reference to the changeover threshold table T2. In this case, the detection packet interval Mp and the changeover threshold Nc are parameters for the antenna selection process used in the second selection process of FIG. 6. In addition, the process at steps S4 to S6 is referred to as a first selection process. As described above, the first selection process includes calculating the electric field parameters P1 and P2 based on the measured RSSI measurement values R11n, R12n, R21n and R22n, selecting the setting value of the detection packet interval Mp based on the calculated values of the calculated electric field parameters P1 and P2 with reference to the detection packet interval table T1, and selecting the setting value of the changeover threshold Nc with reference to the changeover threshold table T2 based on the calculated values of the calculated electric field parameters P1 and P2.

As shown in FIG. 3, the detection packet interval table T1 includes eight setting values of the detection packet interval Mp for two setting values of the electric field parameter P1 and four setting values of the electric field parameters P2. In this case, the eight setting values of the detection packet interval Mp are set so as to decrease with an increase in the setting value of the electric field parameter P1 and to increase with an increase in the setting value of the electric field parameter P2.

In addition, as shown in FIG. 4, the changeover threshold table T2 includes four setting values of the changeover threshold Nc (threshold of a number of times) for two setting values of the electric field parameter P1 and four setting values of the electric field parameter P2. In this case, the eight setting values of the changeover threshold Nc are set so as to decrease with the increase in the setting value of the electric field parameter P1 and so as to increase with the increase in the setting value of the electric field parameter P2.

Therefore, according to the first selection process, it is possible to set the detection packet interval Mp corresponding to the detection time interval of the received electric field so that the detection packet interval Mp decreases with the increase in the received electric field at the client apparatus 200 and increases with the increase in the time-lapse change in the received electric field. In addition, it is possible to set the changeover threshold Nc of each radiation pattern so that the changeover threshold Nc decreases with the increase in the received electric field and increases with the increase in the time-lapse change in the received electric field.

Next, referring back to FIG. 6, a number of times ng is initialized to zero at step S7, a packet count m is initialized to zero at step S8, and one is added to the packet count m at the time of receiving packets at step S9. It is judged at step S10 whether or not the packet count m is equal to the detection packet interval Mp. If YES at step S10, then the control flow goes to step S11. If NO at step S10, then the control flow returns to step S8. At step S11, the controller 201 measures RSSIs by using the antenna apparatuses 1P and 2P, and calculates an average value RSSIav of the measured RSSIs. In this case, the average value RSSIav corresponds to the received electric field at the client apparatus 200. Next, at step S12, it is judged whether or not the average value RSSIav of the RSSIs is larger than −70 dBm. If YES at step S12, the number of times ng is initialized to zero at step S17, and the control flow returns to step S8. If NO at step S12, the one is added to the number of times ng at step S13, and the control flow goes to step S14. At step S14, it is judged whether or not the number of times ng is equal to the changeover threshold Nc. If NO at step S14, then the control flow returns to step S8. If NO at step S14, the control flow goes to step S15. Further, it is judged at step S15 whether or not the currently selected antenna combination Cj is C4. If YES at step S15, then the control flow returns to step S1 of FIG. 5. If NO at step S15, then the control flow goes to step S16 by the controller 201. At step S16, the controller 201 controls the switches SW1 and SW2 to select a next antenna combination Cj+1 that has a priority lower than the priority of the currently selected antenna combination Cj with reference to the antenna combination table T3, controls the wireless communication circuit 204 to start receiving packets, and the control flow returns to step S7.

In this case, the process at steps S7 to S16 of FIG. 6 is referred to as a second selection process. As described above, the second selection process includes selecting a combination Cj from among the antenna combinations C1 to C4, controlling the antenna apparatuses 1P and 2P to be set to have the combination Cj, calculating the average value RSSIav corresponding to the received electric field at the client apparatus 200 every detection packet interval Mp selected at step S6, and selecting the antenna combination Cj+1 other than the antenna combination Cj when the controller 201 successively detects that the average value RSSIav is equal to or smaller than −70 dBm by the changeover threshold Nc selected at step S6.

As described above in detail, according to the present preferred embodiment, the controller 201 calculates the electric field parameters P1 and P2 based on the RSSI measurement values R11$n$ and R21$n$ for the wireless signal received by the antenna apparatus 1P and the RSSI measurement values R12$n$ and R22$n$ for the wireless signal received by the antenna apparatus 2P. The controller 201 selects the setting values of the detection packet interval Mp and the changeover threshold Nc, which are the selection process parameters for the antenna selection process, with reference to the detection packet interval table T1 and the changeover threshold table T2 based on the calculated electric field parameters P1 and P2. Further, in the detection packet interval table T1, each setting value of the detection packet interval Mp is set so that the detection packet interval Mp decreases with the increase in the electric field parameter P1 and increases with the increase in the electric field parameter P2. In the changeover threshold table T2, four setting values of the changeover threshold Nc are set so that the changeover threshold Nc decreases with the increase in the electric field parameter P1 and increases with the increase in the electric field parameter P2. Therefore, unnecessary antenna control can be suppressed by reducing the number of times of the antenna element changeover of the respective antenna apparatuses 1P and 2P as compared with that of the prior art. Therefore, the radiation patterns of the antenna apparatuses 1P and 2P can be changed more efficiently in response to the variation in the radio wave propagation environment than in of the prior art.

In addition, at the time of manufacture of the client apparatus 200, the client apparatus 200 receives the detection packet interval table T1 and the changeover threshold table T2 from the host apparatus 100 via the interface 206 and previously stores the same tables into the flash memory 203. Therefore, as compared with a case where the detection packet interval table T1 and the changeover threshold table T2 stored in the host apparatus 100 are referred to every time the antenna selection process is performed, the processing speed can be improved, and the load of the client apparatus 200 can be reduced. The client apparatus 200 may receive the detection packet interval table T1 and the changeover threshold table T2 from the host apparatus 100 via the interface 206 and store the tables into the flash memory 203 every time the client apparatus is turned on.

Further, in a case where a plurality of client apparatuses 200 are installed in an aircraft, the radio wave propagation environments at the respective client apparatuses 200 are different from each others. However, according to the present preferred embodiment, the detection packet interval Mp and the changeover threshold Nc on which the radio wave propagation environment is reflected can be set automatically at each client apparatus 200. Therefore, a common antenna selection process program can be used for such plurality of client apparatuses 200. Therefore, a common wireless LAN module and the common software can be used for a plurality of client apparatuses 200. In addition, it is not required to manually adjust the detection packet interval Mp and the changeover threshold Nc of the parameters for the antenna selection process in each client apparatus 200, and therefore, the development period of the client apparatus 200 can be shortened than that of the prior art.

In the present preferred embodiment, the antenna apparatus 1P is configured to include the two antenna elements 1$v$ and 1$h$, and the antenna apparatus 2P is configured to include the two antenna elements 2$v$ and 2$h$, however, the present invention is not limited to this. Each of the antenna apparatuses 1 and 2 may be configured to include a plurality of three or more antennas having radiation patterns different from each other or may be an antenna apparatus having a plurality of radiation patterns that can be mutually changed over.

In addition, the detection packet interval Mp is selected from among the eight setting values of FIG. 3 in the present preferred embodiment, however, the present invention is not limited to this. The detection packet interval Mp may be selected from among a plurality of arbitrary number of setting values so that the detection packet interval Mp decreases with the increase in the electric field parameter P1 and increases with the increase in the electric field parameter P2. In addition, the detection packet interval Mp may be o calculated by using an arbitrary function that is set so that the detection packet interval Mp decreases with the increase in the electric field parameter P1 and increases with the increase in the electric field parameter P2. Further, the changeover threshold Nc is selected from among the eight setting values of FIG. 3 in the present preferred embodiment, however, the present invention is not limited to this. The changeover threshold Nc may be selected from among a plurality of arbitrary number of setting values that are set so that the changeover threshold Nc decreases with the increase in the electric field parameter P1 and increases with the increase in the electric field parameter P2. In addition, the changeover threshold Nc may be calculated by using an arbitrary function that is set so that the changeover threshold Nc decreases with the increase in the electric field parameter P1 and increases with the increase in the electric field parameter P2.

Further, the average value RSSIav of each measured RSSI is calculated at step S11, however, the present invention is not limited to this. A linear combined value Rcom of each measured RSSI may be calculated. In this case, the linear combined value Rcom is calculated by using an RSSI measurement value RSSI1 for the antenna apparatus 1P, an RSSI measurement value RSSI2 for the antenna apparatus 2P, and linear combining coefficients "a" and "b" by using the following Equation:

$$R\text{com} = a \times \text{RSSI1} + b \times \text{RSSI2} \qquad (3).$$

For example, the measurement value of the smaller one of the RSSI measurement values RSSI1 and RSSI2 may be set as the linear combined value Rcom by setting one of the linear combining coefficients "a" and "b" to zero and setting another combining coefficientt to one.

In addition, an RSSI measurement interval, a number of times of measurement and a waiting time at steps S2 and S3 are not limited to the setting values shown in FIG. 5 but allowed to be other arbitrary setting values.

In addition, the antenna selection process parameters include the detection packet interval Mp of the average value RSSIav of the RSSIs representing the received electric field, however, the present invention is not limited to this. The antenna selection process parameters may include a detection time interval of the average value RSSIav of the RSSI representing the received electric field.

Second Preferred Embodiment

Figure 9:
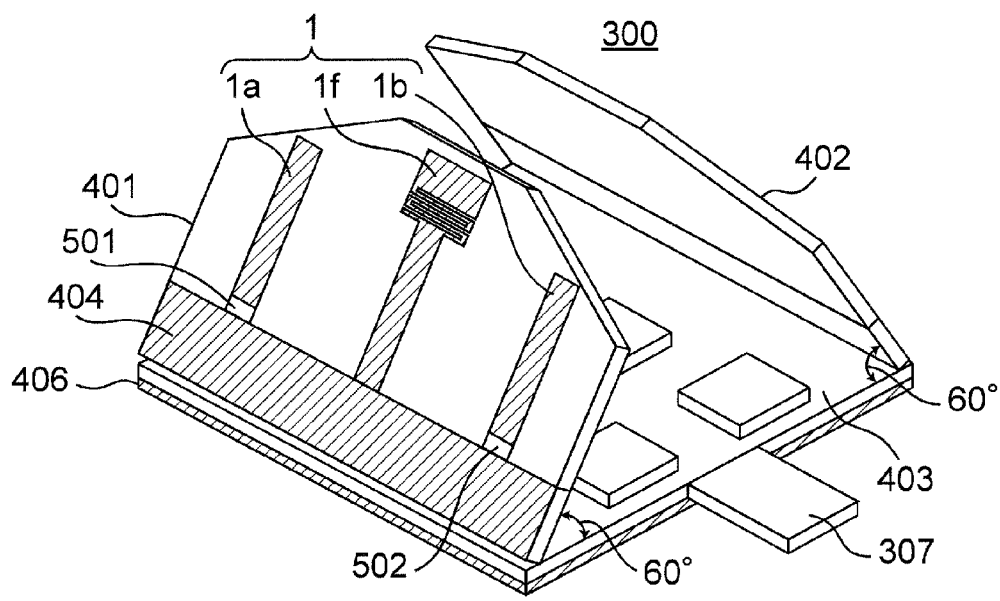
FIG. 9 is a perspective view of the wireless communication apparatus 300 of FIG. 8.
Figure 10:
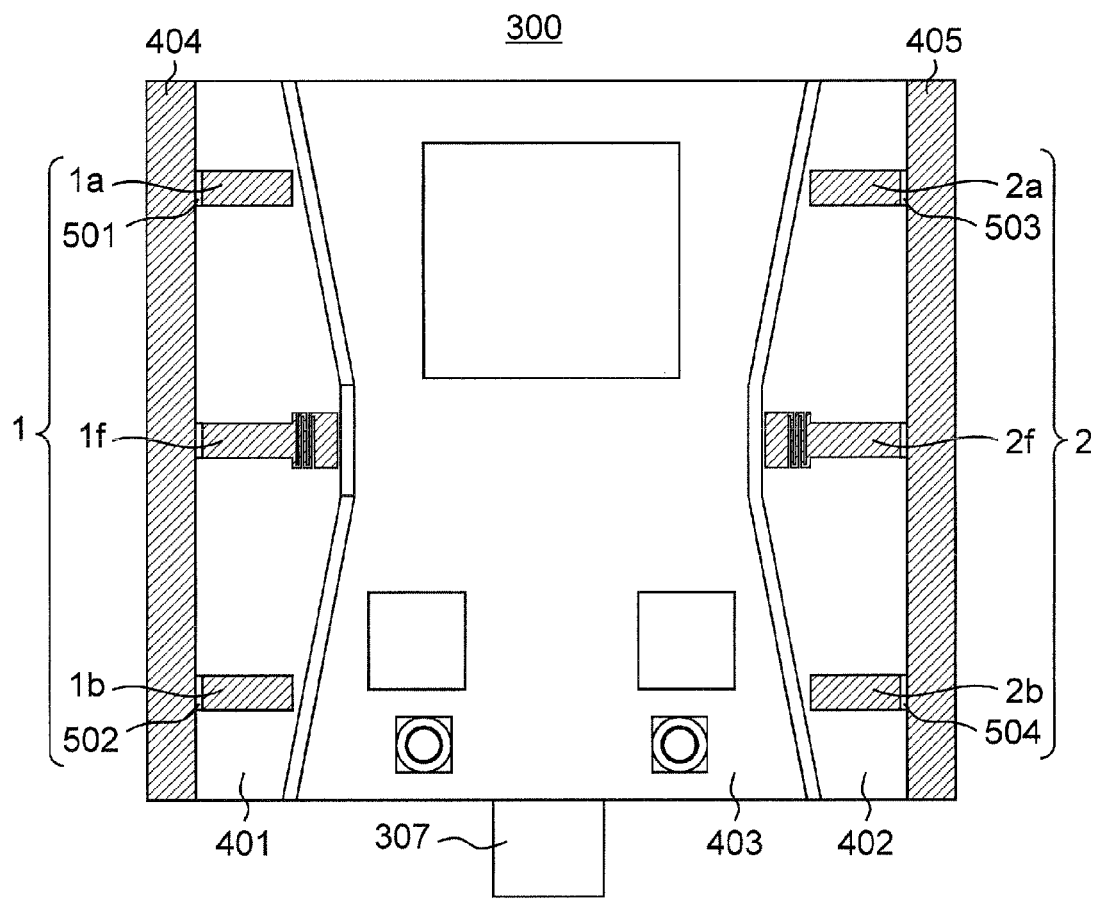
FIG. 10 is a plan view of the wireless communication apparatus 300 of FIG. 8.
Figure 11:
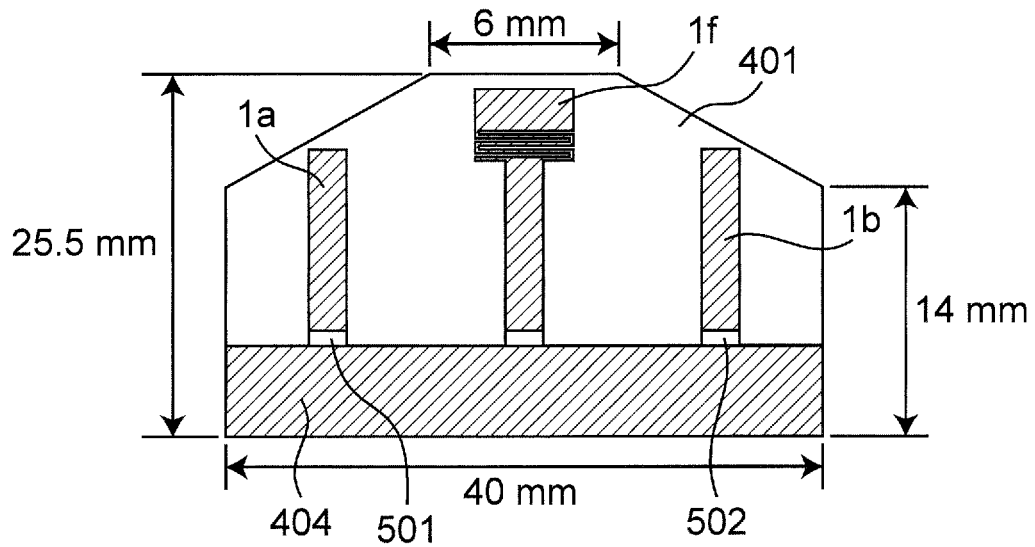
FIG. 11 is a plan view of the substrate 401 of FIG. 9.
Figure 12:
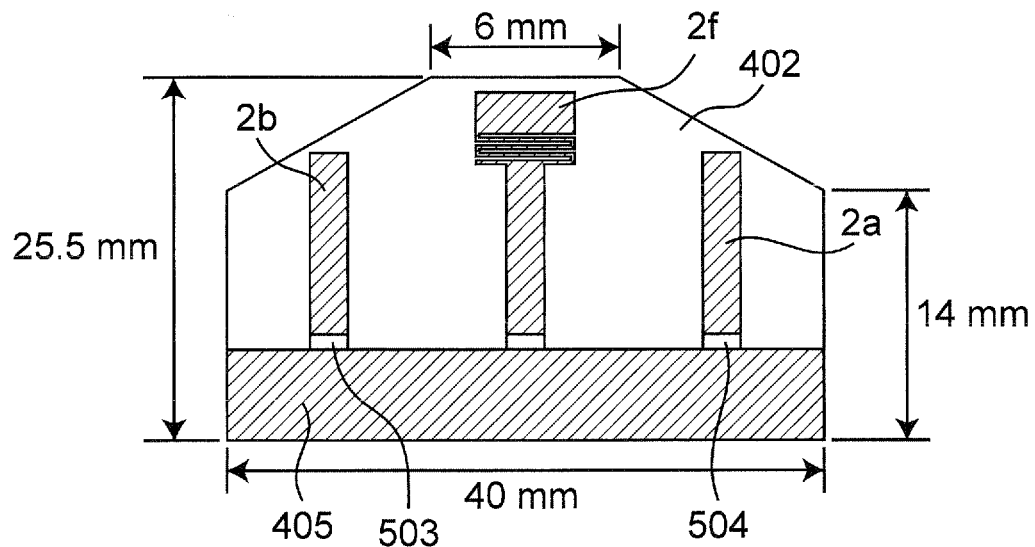
FIG. 12 is a plan view of the substrate 402 of FIG. 9.
Figure 13A:
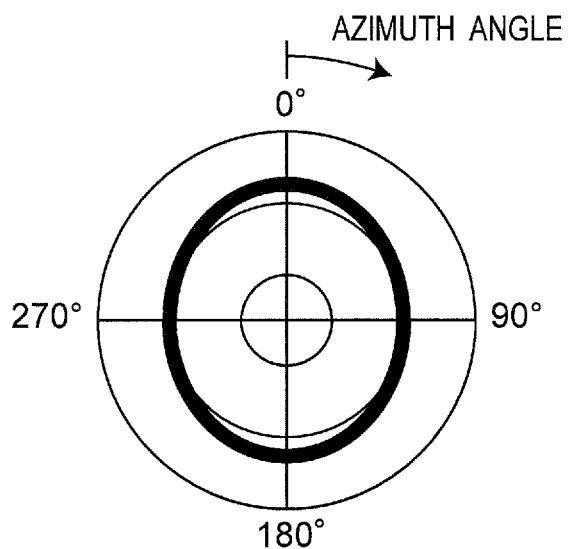
FIG. 13A is a graph showing a radiation pattern of an array antenna apparatus 1 when parasitic elements 1a and 1b of FIG. 11 are turned off.
Figure 13B:
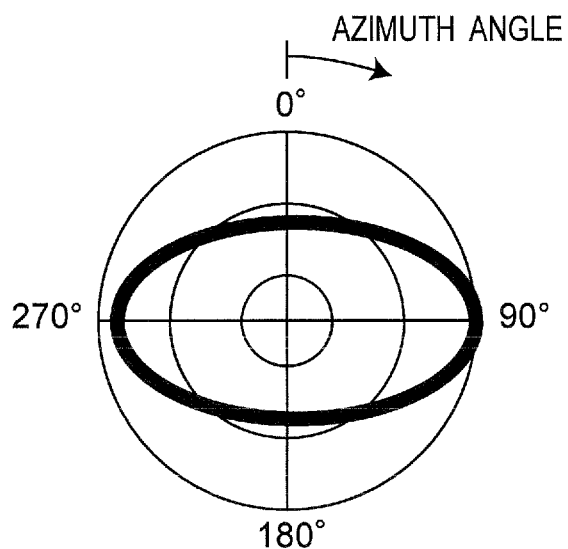
Figure 13C:
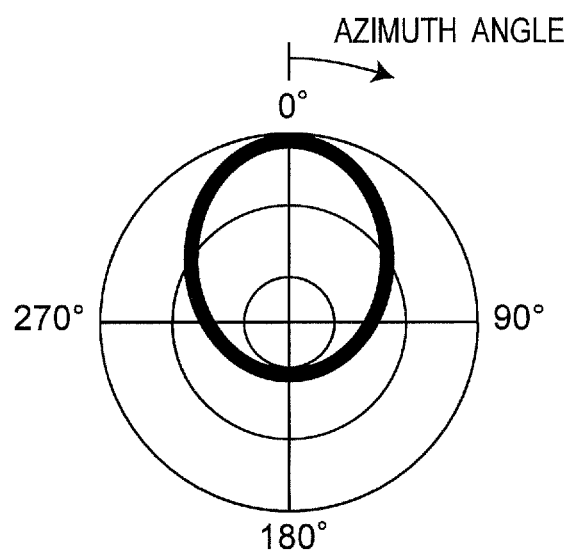
Figure 13D:
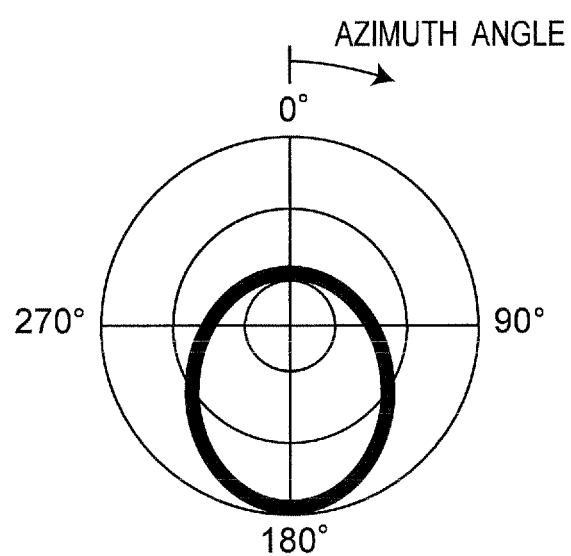

FIG. 8 is a block diagram showing a configuration of a wireless communication apparatus 300 according to the second preferred embodiment of the present invention. FIG. 9 is a perspective view of the wireless communication apparatus 300 of FIG. 8, and FIG. 10 is a plan view of the wireless communication apparatus 300 of FIG. 8. FIG. 11 is a plan view of the substrate 401 of FIG. 9, and FIG. 12 is a plan view of the substrate 402 of FIG. 9. Further, FIG. 13A is a graph showing a radiation pattern of an array antenna apparatus 1 when parasitic elements 1a and 1b of FIG. 11 are turned off, and FIG. 13B is a graph showing a radiation pattern of the array antenna apparatus 1 when only the parasitic element 1b of FIG. 11 is turned on. FIG. 13C is a graph showing a radiation pattern of the array antenna apparatus 1 when the parasitic elements 1a and 1b of FIG. 11 are turned on, and FIG. 13D is a graph showing a radiation pattern of the array antenna apparatus 1 when only the parasitic element 1a of FIG. 11 is turned on.

As described in detail later, the wireless communication apparatus 300 of the present preferred embodiment includes:

(a) the array antenna apparatus 1 having four radiation patterns different from each other;

(b) an array antenna apparatus 2 having four radiation patterns different from each other;

(c) a ROM 302 for previously storing a radiation pattern selection process parameter table T5 including setting values of selection process parameters THg, Ncg, Mpg, THs, Ncs and Mps to setting values of the electric field parameter Rmax, which is calculated by using an RSSI measurement value R1 representing the received signal level of the wireless signal received by the array antenna apparatus 1 and an RSSI measurement value R2 representing the received signal level of the wireless signal received by the array antenna apparatus 2; and (d) a controller 301 for controlling the radiation patterns of the array antenna apparatuses 1 and 2 by changing over the radiation patterns of the array antenna apparatuses 1 and 2 with reference to the radiation pattern selection process parameter table T5.

In this case, when the controller 301 selects a radiation pattern combination A(1,1) from among a plurality of radiation pattern combinations of the plurality of radiation patterns of the array antenna apparatus 1 and the plurality of radiation patterns of the array antenna apparatus 2 and controls the array antenna apparatus 1 and 2 to be set to have the radiation pattern combination A(1,1), the controller 301 measures the RSSI measurement values R1 and R2. The controller 301 calculates the electric field parameter Rmax based on measured RSSI measurement values R1 and R2, and selects the setting values of the selection process parameters THg, Ncg, Mpg, THs, Ncs and Mps by using the first selection process of FIG. 16 with reference to the radiation pattern selection processing parameter table T5 based on a calculated electric field parameter Rmax. The controller 301 selects one combination from among the plurality of radiation pattern combinations by using the second selection process of FIG. 17 based on selected setting values of the selection process parameters THg, Ncg, Mpg, THs, Ncs and Mps, and controls the array antenna apparatuses 1 and 2 to be set to have the selected radiation pattern combination.

In particular, when the controller 301 selects the radiation pattern combination A(1,1) from among a plurality of radiation pattern combinations of the plurality of radiation patterns of the array antenna apparatus 1 and the plurality of radiation patterns of the array antenna apparatus 2 and controls the array antenna apparatus 1 and 2 to be set to have the radiation pattern combination A(1,1), the controller 301 measures the RSSI measurement values R1 and R2. The controller 301 sets the changeover threshold received electric field THg of the respective radiation patterns so that the changeover threshold received electric field THg increases with an increase in the received electric field at the wireless communication apparatus 300 based on measured RSSI measurement values R1 and R2. Further, the controller 301 is characterized by measuring the RSSI measurement values R1 and R2 every detection packet interval Mpg, and controlling the radiation pattern combination to be changed over to a further radiation pattern combination when the controller 301 successively detects by the changeover threshold Ncg that at least one of the measured RSSI measurement values R1 and R2 is equal to or smaller than the changeover threshold received electric field THg set as above.

The configuration and operation of the wireless communication apparatus 300 of the present preferred embodiment are concretely described below. Referring to FIG. 8, the wireless communication apparatus 300 is a wireless communication apparatus of the 2×2 MIMO transmission system conforming to the wireless LAN communication standard IEEE802.11n, and is configured to include the controller 301, the ROM 302, a RAM 303, a wireless communication circuit 204, an antenna apparatus 10A having array antenna apparatuses 1 and 2, a USB (Universal Serial Bus) interface 306, a USB connector 307, and a bus 310. Further, as shown in FIGS. 9 to 12, the array antenna apparatus 1 is configured to include a feed element 1f, parasitic elements 1a and 1b, and a radiation pattern controller 311. The array antenna apparatus 2 is configured to include a feed element 2f, parasitic elements 2a and 2b, and a radiation pattern controller 312.

Referring to FIG. 8, the controller 301 is concretely configured by a CPU, and is connected to the ROM 302, the RAM 303, the wireless communication circuit 204, and the USB interface 306 via the bus 310 to control them. In addition, the controller 301 executes various software functions. Further, the controller 301 controls the radiation pattern controllers 311 and 312 so that the array antenna apparatuses 1 and 2 have respective selected radiation patterns in the radiation pattern selection process described in detail later. The ROM 302 previously stores various software programs, which are required for the operation of the client apparatus 300 and are executed by the controller 301, programs of the radiation pattern selection process of FIG. 16, the radiation pattern group selection process of FIG. 17 and the radiation pattern subgroup selection process of FIG. 18, the radiation pattern table T4 of FIG. 14, and the radiation pattern selection process parameter table T5 of FIG. 15. In addition, the RAM 303 is used as a working area of the controller 301 to store temporary data generated at the time of executing the programs. Further, the USB interface 306 is connected to the USB connector 307. By executing interface processes of USB communications such as signal conversion and protocol conversion, the USB interface 306 receives signals and data from apparatuses connected to the USB connector 307, and transmits signals and data to the apparatuses connected to the USB connector 307.

In addition, referring to FIG. 8, the wireless communication circuit 204 is configured in a manner similar to that of the wireless communication circuit 204 of the first preferred embodiment of FIG. 1, and executes processes similar to those of the first preferred embodiment on each wireless signal from the array antenna apparatus 1. In the present preferred embodiment, it is noted that the wireless communication circuit 204 calculates RSSI representing the received signal level of the wireless signal of the baseband signal from the array antenna apparatus 1 by using preamble data every data packet at the time of receiving each data packet, and outputs an average value of the last eight RSSIs to the controller 301 as the RSSI measurement value R1 for the wireless signal received by the array antenna apparatus 1. In a manner similar to above, the wireless communication circuit 204 outputs the RSSI measurement value R2 for the wireless signal received by the array antenna apparatus 2 to the controller 301.

As shown in FIG. 9, the wireless communication apparatus 300 includes a dielectric substrate 403 on which the controller 301, the ROM 302, the RAM 303, the wireless communication circuit 204, the radiation pattern controllers 311 and 312, and the USB interface 306 are mounted, a dielectric substrate 401 on which the array antenna apparatus 1 is mounted, and a dielectric substrate 402 on which the array antenna apparatus 2 is mounted. The substrates 401 and 402 are fixed to opposing two sides of the substrate 403, respectively, with making angles of 60 degrees with respect to the substrate 401. In addition, the USB connector 307 is fixed to another one side of the substrate 403. In addition, a grounding conductor 406 is formed on a back surface of the substrate 403.

In the array antenna apparatus 1 of FIG. 11, the feed antenna element if is a dual-band type monopole antenna formed as a conductor pattern on a surface of the substrate 401 to transmit and receive the wireless signals of 2.5 GHz and 5 GHz. In addition, the parasitic elements 1a and 1b are formed as strip-shaped conductor patterns on both sides of the feed antenna element 1f. In this case, a distance between each of the parasitic elements 1a and 1b and the feed antenna element 1f is set to a distance that is one-fourth of an operating wavelength λ when the wireless signal of 5 GHz is transmitted and received via the feed antenna element 1f. The distance of one-fourth of the operating wavelength λ corresponds to a distance at which the feed antenna element 1f and the parasitic elements 1a and 1b are electromagnetically coupled to each other, and changes depending on the dielectric constant of the dielectric substrate 401 used so that the distance of one-fourth of the operating wavelength λ becomes shorter as the dielectric constant becomes higher. Further, one end of the parasitic element 1a is connected to a grounding conductor 404 via a PIN diode 501 formed on the surface of the substrate 401, and is connected to a control line (not shown) for applying a control voltage via a high-frequency blocking inductor (not shown). The radiation pattern controller 311 turns on or off the PIN diode 501 by applying a predetermined control voltage between the PIN diode 501 and the control line so as to changeover between operating the parasitic element 1a as a reflector and not operating the parasitic element 1a as the reflector. Further, one end of the parasitic element 1b is connected to the grounding conductor 404 via a PIN diode 502 formed on the surface of the substrate 401, and connected to a control line (not shown) for applying a control voltage via a high-frequency blocking inductor (not shown). The radiation pattern controller 311 turns on or off the PIN diode 502 by applying a predetermined control voltage between the PIN diode 502 and the control line so as to changeover between operating the parasitic element 1b as a reflector and not operating the parasitic element 1a as the reflector. Namely, the radiation pattern controller 311 selectively changes over among four radiation patterns different from each other so as to select one radiation patter from among the four radiation patterns by changing over between operating each of the parasitic element 1a and 1b as a reflector and not operating each of the parasitic element 1a and 1b. Turning on or off a PIN diode connected to a parasitic element is referred to as "turning on or off the parasitic elements" hereinafter.

Four radiation patterns of the array antenna apparatus 1 are described with reference to FIGS. 13A to 13D. Referring to FIGS. 13A to 13D, an azimuth angle in a direction seen from the feed element 1f to the parasitic element 1a on the substrate 401 is defined as 0 degrees, and an azimuth angle in a direction seen from the feed element 1f to the parasitic element 1b is defined as 180 degrees. As shown in FIG. 13A, when the parasitic elements 1a and 1b are turned off, the parasitic elements 1a and 1b do not exert any influence on the radiation pattern of the feed antenna element 1f, and the radiation pattern of the array antenna apparatus 1 is substantially the same as the omnidirectional radiation pattern of the feed antenna element 1f. In addition, when the parasitic elements 1a and 1b are turned on as shown in FIG. 13B, each of the parasitic elements 1a and 1b operates as a reflector, and therefore, the radiation pattern of the array antenna apparatus 1 has main beams in the directions of azimuth angles of 90 degrees and 270 degrees, respectively. Further, when only the parasitic element 1b is turned on as shown in FIG. 13C, the parasitic element 1b operates as a reflector, and therefore, the radiation pattern of the array antenna apparatus 1 has a main beam in the direction of an azimuth angle of 0 degrees. Still further, when only the parasitic element 1a is turned on as shown in FIG. 13D, the parasitic element 1a operates as a reflector, and therefore, the radiation pattern of the array antenna apparatus 1 has a main beam in the direction of an azimuth angle of 180 degrees. As described above, the array antenna apparatus 1 has the four radiation patterns shown in FIGS. 13A to 13D, respectively.

Further, the array antenna apparatus 2 of FIG. 12 is configured to include a feed antenna element 2f, parasitic elements 2a and 2b, and configured in a manner similar to that of the array antenna apparatus 1 of FIG. 11. In this case, as shown in FIG. 10, the parasitic elements 1a and 2a are provided so as to be opposed to each other, and the parasitic elements 1b and 2b are provided so as to be opposed to each other. One end of the parasitic element 2a is connected to a grounding conductor 405 via a PIN diode 504 formed on the surface of the substrate 402, and is connected to a control line (not shown) for applying a control voltage via a high-frequency blocking inductor (not shown). The radiation pattern controller 312 turns on or off the PIN diode 504 by applying a predetermined control voltage between the PIN diode 504 and the control line so as to changeover between operating the parasitic element 2a as a reflector and not operating the parasitic element 2a as the reflector. Further, one end of the parasitic element 2b is connected to the grounding conductor 405 via a PIN diode 503 formed on the surface of the substrate 402, and is connected to a control line (not shown) for applying a control voltage via a high-frequency blocking inductor (not shown). The radiation pattern controller 312 turns on or off the PIN diode 503 by applying a predetermined control voltage between the PIN diode 503 and the control line so as to changeover between operating the parasitic element 2b as a reflector and not operating the parasitic element 2b as the reflector. Namely,the radiation pattern controller 312 selectively changes over among four radiation patterns different from each other so as to select one radiation pattern from among the four radiation patterns by changing over between operating each of the parasitic element 2a and 2b as a reflector and not operating each of the parasitic element 2a and 2b. The array antenna apparatus 2 has four radiation patterns (See FIGS. 13A to 13D) in a manner similar to that of the array antenna apparatus 1.

In the radiation pattern selection process described in detail later, the controller 301 selects one radiation pattern combination of the array antenna apparatuses 1 and 2 based on the RSSI measurement values R1 and R2 r the wireless signals received by the array antenna apparatuses 1 and 2, and controls the radiation pattern controllers 311 and 312 to be set to have a selected radiation pattern combination.

FIG. 14 is a table showing the radiation pattern table T4 of FIG. 8. The radiation pattern table T4 includes a plurality of radiation pattern combinations included in respective radiation pattern groups G1 to G4. A plurality of combinations of the four radiation patterns of the array antenna apparatus 1 and the four radiation patterns of the array antenna apparatus 2 are classified into the radiation pattern groups G1 to G4 considering the directivity characteristics of combined radiation patterns (a combined radiation pattern is a radiation pattern obtained by combining the radiation pattern of the array antenna apparatus 1 with the radiation pattern of the array antenna apparatus 2). Further, each of the radiation pattern groups Gk (k=1, 2, 3, 4) includes radiation pattern subgroups Ak and Bk. The radiation patterns of the array antenna apparatus 1 included in the radiation pattern combinations A(k,1) to A(k,4) included in the radiation pattern subgroup Ak are the same as each other, and the radiation patterns of the array antenna apparatus 2 included in the radiation pattern combinations A(k,1) to A(k,4) included in the radiation pattern subgroup Ak are different from each other. Further, the radiation patterns of the array antenna apparatus 1 included in the radiation pattern combinations B(k,1) to B(k,4) included in the radiation pattern subgroup Bk are different from each other, and the radiation patterns of the array antenna apparatus 2 included in the radiation pattern combinations B(k,1) to B(k,4) included in the radiation pattern subgroup Bk are the same as each other. Still further, the radiation pattern groups A(k,1) and B(k,1) are the same as each other. Referring to FIG. 14, the underlined radiation pattern combinations are each used at step S82 of the radiation pattern group selection process of FIG. 17.

In addition, referring to FIG. 4, the radiation pattern groups G1, G2, G3 and G4 have higher priorities in the order of the radiation pattern groups G1, G2, G3 and G4. In addition, the radiation pattern combinations A(k,1), A(k,2), A(k,3) and A(k,4) have higher priorities in the order of the radiation pattern combinations A(k,1), A(k,2), A(k,3) and A(k,4), and the radiation pattern combinations B(k,1), B(k,2), B(k,3) and B(k,4) have higher priorities in the order of the radiation pattern combinations B(k,1), B(k,2), B(k,3) and B(k,4). The controller 301 performs changeover of the radiation pattern groups G1 to G4 with reference to the radiation pattern table T4 according to the priorities described above, and performs changeover of the radiation pattern combinations A(k,1) to A(k,4) and changeover of the radiation pattern combinations B(k,1) to B(k,4).

Concretely speaking, referring to FIG. 14, the radiation pattern group G1 includes the radiation pattern subgroups A1 and B1. The radiation pattern subgroup A1 includes the radiation pattern combinations A(1,1) to A(1,4) in which the parasitic element 1b is turned on. The radiation pattern subgroup B1 includes the radiation pattern combinations B(1,1) to B(1,4) in which the parasitic element 2a is turned on. In the radiation pattern combinations A(1,1) and B(1,1), both of the parasitic elements 1b and 2a are turned on. In addition, the radiation pattern group G2 includes the radiation pattern subgroups A2 and B2. The radiation pattern subgroup A2 includes the radiation pattern combinations A(2,1) to A(2,4) in which the parasitic element 1a is turned on. The radiation pattern subgroup B2 includes the radiation pattern combinations B(2,1) to B(2,4) in which the parasitic element 2b is turned on. In the radiation pattern combinations A(2,1) and B(2,1), both of the parasitic elements 1a and 2b are turned on. Further, the radiation pattern group G3 includes the radiation pattern subgroups A3 and B3. The radiation pattern subgroup A3 includes the radiation pattern combinations A(3,1) to A(3,4) in which the parasitic elements 1a and 1b are turned off. The radiation pattern subgroup B3 includes the radiation pattern combinations B(3,1) to B(3,4) in which the parasitic elements 2a and 2b are turned off. In the radiation pattern combinations A(3,1) and B(3,1), all the parasitic elements 1a, 1b, 2a and 2b are turned off. Still further, the radiation pattern group G4 Includes the radiation pattern subgroups A4 and B4. The radiation pattern subgroup A4 includes the radiation pattern combinations A(4,1) to A(4,4) in which the parasitic elements 1a and 1b are turned on. The radiation pattern subgroup B4 includes the radiation pattern combinations B(4,1) to B(4,4) in which the parasitic element 2a and 2b are turned on. In the radiation pattern combinations A(4,1) and B(4,1), all the parasitic elements 1a, 1b, 2a and 2b are turned on.

Namely, the radiation pattern group G1 includes the combined radiation patterns, which have the radiation pattern (See FIG. 13C) having the main beam in one direction where only the parasitic element 1b is turned on in the array antenna apparatus 1 or the radiation pattern (See FIG. 13D) having the main beam in one direction in which only the parasitic element 2a is turned on in the array antenna apparatus 2, as a basic pattern. In addition, the radiation pattern group G2 includes the combined radiation patterns, which have the radiation pattern (See FIG. 13D) having the main beam in one direction where only the parasitic element 1a is turned on in the array antenna apparatus 1 or the radiation pattern (See FIG. 13C) having the main beam in one direction in which only the parasitic element 2b is turned on in the array antenna apparatus 2, as a basic pattern. Further, the radiation pattern group G3 includes the combined radiation patterns, which have the substantially omnidirectional radiation pattern (See FIG. 13A), as a basic pattern. Still further, the radiation pattern group G4 includes the combined radiation patterns, which have the radiation pattern (See FIG. 13B) having the bidirectional main beams, as a basic pattern.

Figure 16:
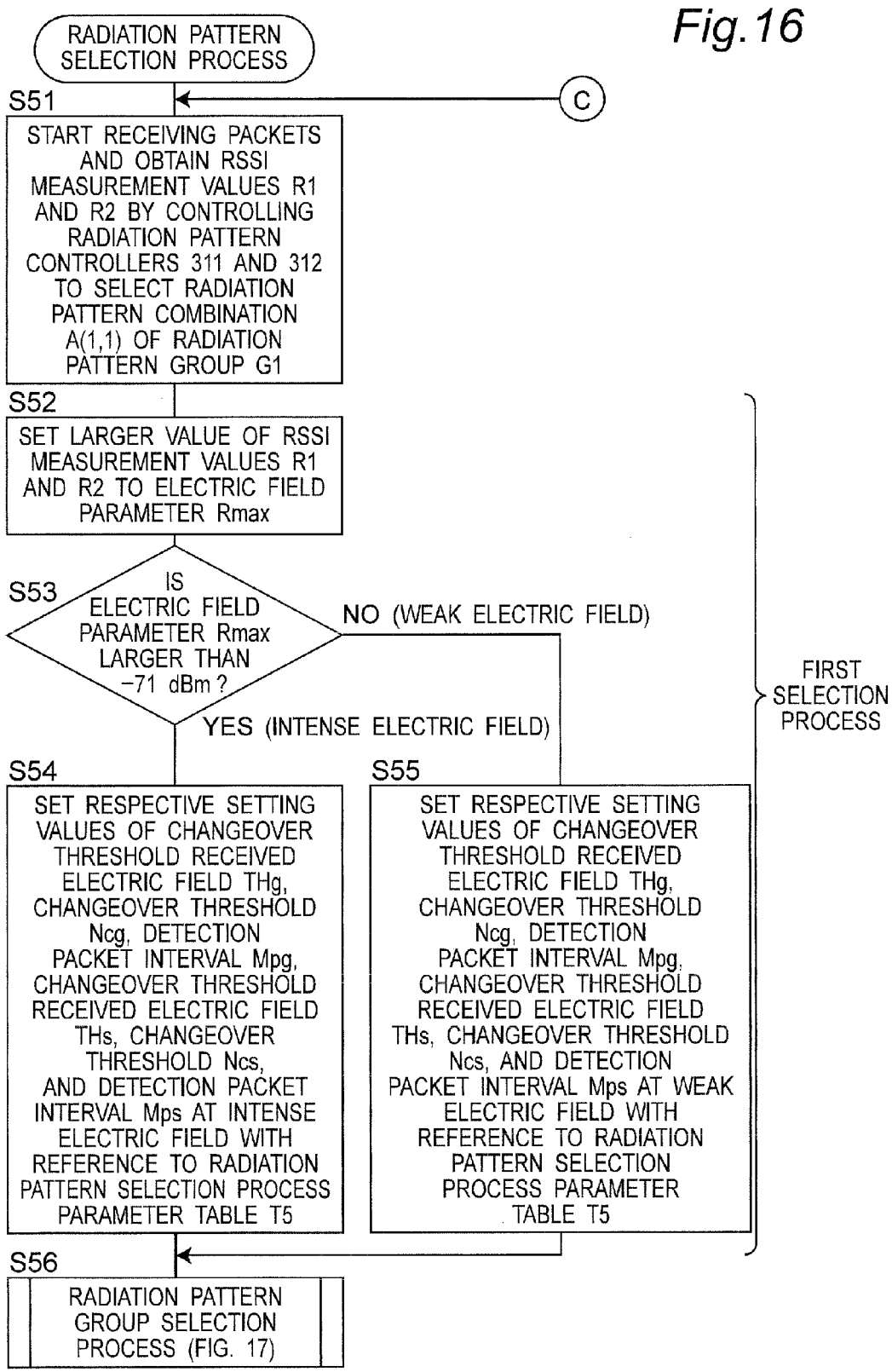
FIG. 16 is a flow chart showing a radiation pattern selection process executed by the controller 301 of FIG. 8.

FIG. 16 is a flow chart showing the radiation pattern selection process executed by the controller 301 of FIG. 8. First of all, at step S51 of FIG. 16, the controller 301 controls the radiation pattern controllers 311 and 312 to select the radiation pattern combination A(1,1) of the radiation pattern group G1 having the highest priority with reference to the radiation pattern table T4, controls the wireless communication circuit 204 to start receiving packets, and obtains the RSSI measurement values R1 and R2. Next, at step S52, the controller 301 calculates the electric field parameter Rmax by setting the larger measurement value of the RSSI measurement values R1 and R2 to the electric field parameter Rmax, and the control flow goes to step S53. In this case, the electric field parameter Rmax corresponds to received electric field at the wireless communication apparatus 300. Then, it is judged at step S53 whether or not the electric field parameter Rmax is larger than −71 dBm. If YES at step S53, then the control flow goes to step S54. If NO at step S53, then the control flow goes to step S55.

Figure 17:
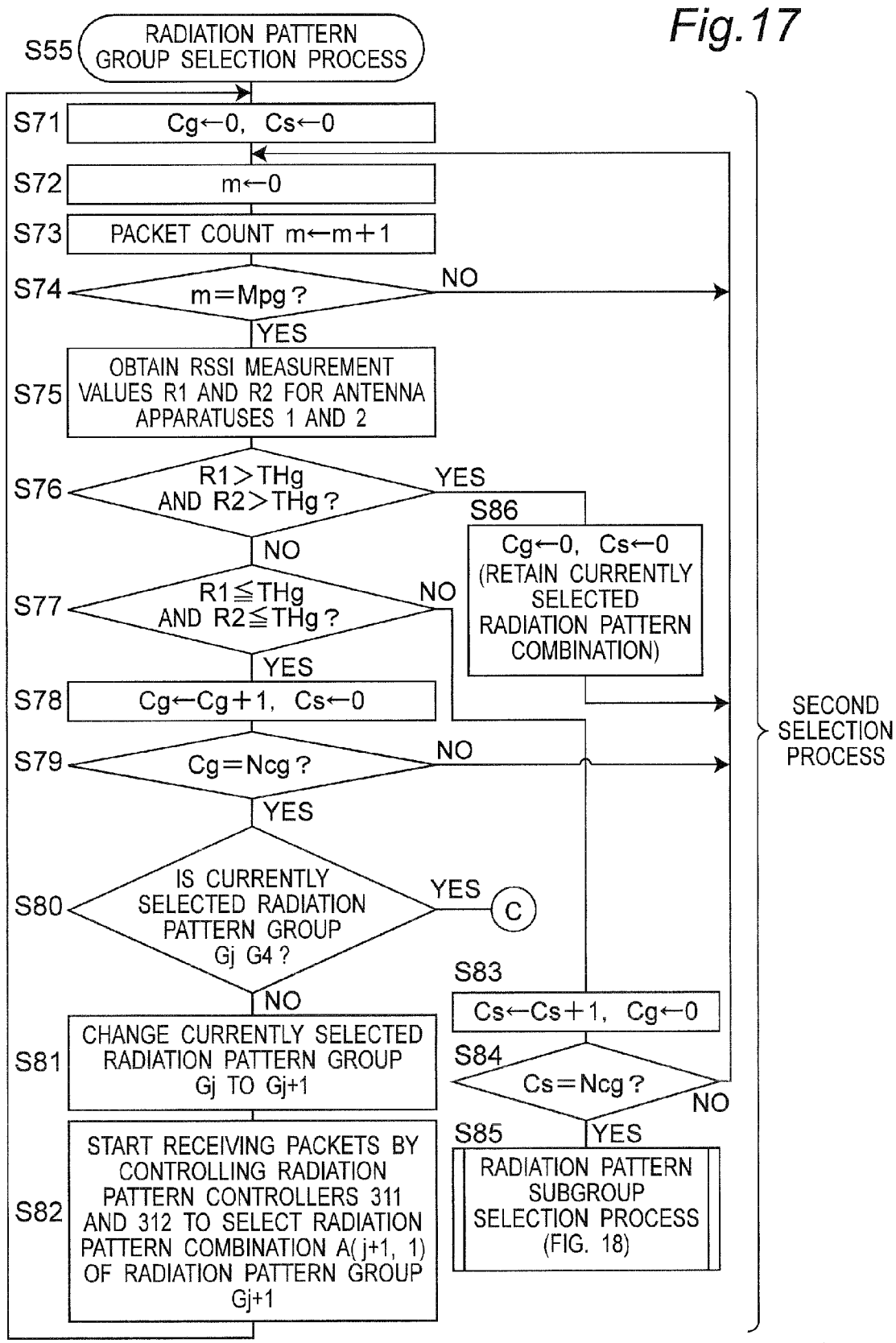
FIG. 17 is a flow chart showing a radiation pattern group selection process of step S56 of FIG. 16.

At step S54, the controller 301 selects the respective setting values of the changeover threshold received electric field THg, the changeover threshold Ncg, the detection packet interval Mpg, the changeover threshold received electric field THs, the changeover threshold Ncs and the detection packet interval Mps at an intense electric field with reference to the radiation pattern selection process parameter table T5. On the other hand, at step S55, the controller 301 selects the respective setting values of the changeover threshold received electric field THg, the changeover threshold Ncg, the detection packet interval Mpg, the changeover threshold received electric field THs, the changeover threshold Ncs and the detection packet interval Mps at a weak electric field with reference to the radiation pattern selection process parameter table T5. Then, subsequently to step S54 or S55, the radiation pattern group selection process of FIG. 17 is executed at step S56.

As shown in FIG. 15, the radiation pattern selection process parameter table T5 includes the setting values of the radiation pattern selection process parameters THg, Ncg, Mpg, THs, Ncs and Mps for two setting values of the electric field parameter Rmax. In addition, the two setting values of the changeover threshold received electric field THg (which is an RSSI threshold value or a received signal level threshold value) are set so that the changeover threshold received electric field THg increases with an increase in the electric field parameter Rmax. The two setting values of the changeover threshold received electric field THs (which is an RSSI threshold value or a received signal level threshold value) are set so that the changeover threshold received electric field THs increases with the increase in the electric field parameter Rmax. Further, each setting value of the changeover threshold received electric field THg is set to a value larger than a setting value of a corresponding changeover threshold received electric field THs. Further, the same two setting values of the changeover threshold Ncg (which is a count value threshold value) are set to have a value smaller than the same two setting values of the changeover threshold Ncs (which is a count value threshold value). The same two setting values of the detection packet interval Mpg (which is an RSSI packet interval) of the RSSI measurement values R1 and R2 are set to have a value smaller than the same two setting values of the detection packet interval Mps (which is an RSSI packet interval) of the RSSI measurement values R1 and R2.

Referring to FIG. 16, the process at steps S52 to S54 is referred to as a first selection process. As described above, the first selection process includes calculating the electric field parameter Rmax based on the measured RSSI measurement values R1 and R2, and selecting the setting values of the radiation pattern selection process parameters THg, Ncg, Mpg, THs, Ncs and Mps with reference to the radiation pattern selection process parameter table T5 based on the calculation value of the calculated electric field parameter Rmax. By executing the first selection process, the changeover threshold received electric field THg can be set to increase with the increase in the received electric field at the wireless communication apparatus 300.

Next, the radiation pattern group selection process at step S56 of FIG. 16 is described. FIG. 17 is a flow chart showing the radiation pattern group selection process at step S56 of FIG. 16. At step S71 of FIG. 17, frequencies Cg and Cs are initialized to zero, respectively, and a packet count m is initialized to zero at step S72. Then, one is added to the packet count m at the time of receiving packets at step S73. At step S74, it is judged whether or not the packet count m is equal to the detection packet interval Mpg. If YES at step S74, then the control flow goes to step S75, and if NO at step S74, then the control flow returns to step S72. At step S75, the controller 301 obtains the RSSI measurement values R1 and R2 for the wireless signals received by the antenna apparatuses 1 and 2.

Next, it is judged at step S76 whether or not both of the RSSI measurement values R1 and R2 are larger than the changeover threshold received electric field THg. If YES at step S76, then the frequencies Cg and Cs are initialized to zero, respectively, at step S86, and the control flow returns step S72 with retaining the currently selected radiation pattern combination without any change. On the other hand, if NO at step S76, then the control flow goes to step S77. At step S77, it is judged whether or not both of the RSSI measurement values R1 and R2 are equal to or smaller than the changeover threshold received electric field THg.

If YES at step S77, then one is added to the number of times Cg, and the number of times Cs is initialized to zero at step S78. Then, it is judged at step S79 whether or not the number of times Cg is equal to the changeover threshold Ncg. If YES at step S79, then the control flow goes to step S80, and if NO at step S79, the control flow returns to S72. Further, it is judged at step S80 whether or not the currently selected radiation pattern group Gj is G4. If YES at step S80, then the control flow returns to step S51 of FIG. 16. If NO at step S80, then the controller 301 changes the currently selected radiation pattern group Gj to a next radiation pattern group Gj+1 at step S81. Next, at step S82, the controller 301 controls the radiation pattern controllers 311 and 312 to select a radiation pattern combination A(j+1,1) of the radiation pattern group Gj+1 with reference to the radiation pattern table T4, and controls the wireless communication circuit 204 to start receiving packets. Then, the control flow returns to step S71. As shown in FIG. 15, the radiation pattern combination A(j+1,1) is the same as the radiation pattern combination B(j+1,1).

If NO at step S77 since one of the RSSI measurement values R1 and R2 is smaller than the changeover threshold received electric field THg, then one is added to the number of times Cs and the number of times Cg is initialized to zero at step S83. Then, it is judged at step S84 whether or not the number of times Cs is equal to the changeover threshold Ncg. If NO at step S84, then the control flow returns to step S72. On the other hand, if YES at step S84, then the control flow goes to the radiation pattern subgroup selection process (FIG. 18) of step S85.

It is noted that the setting value of the detection packet interval Mpg selected at step S54 or S55 of FIG. 16 is used at step S74, the setting value of the changeover threshold Ncg is used at steps S79 and S84, and the setting value of the changeover threshold received electric field THg is used at steps S76 and S77.

Figure 18:
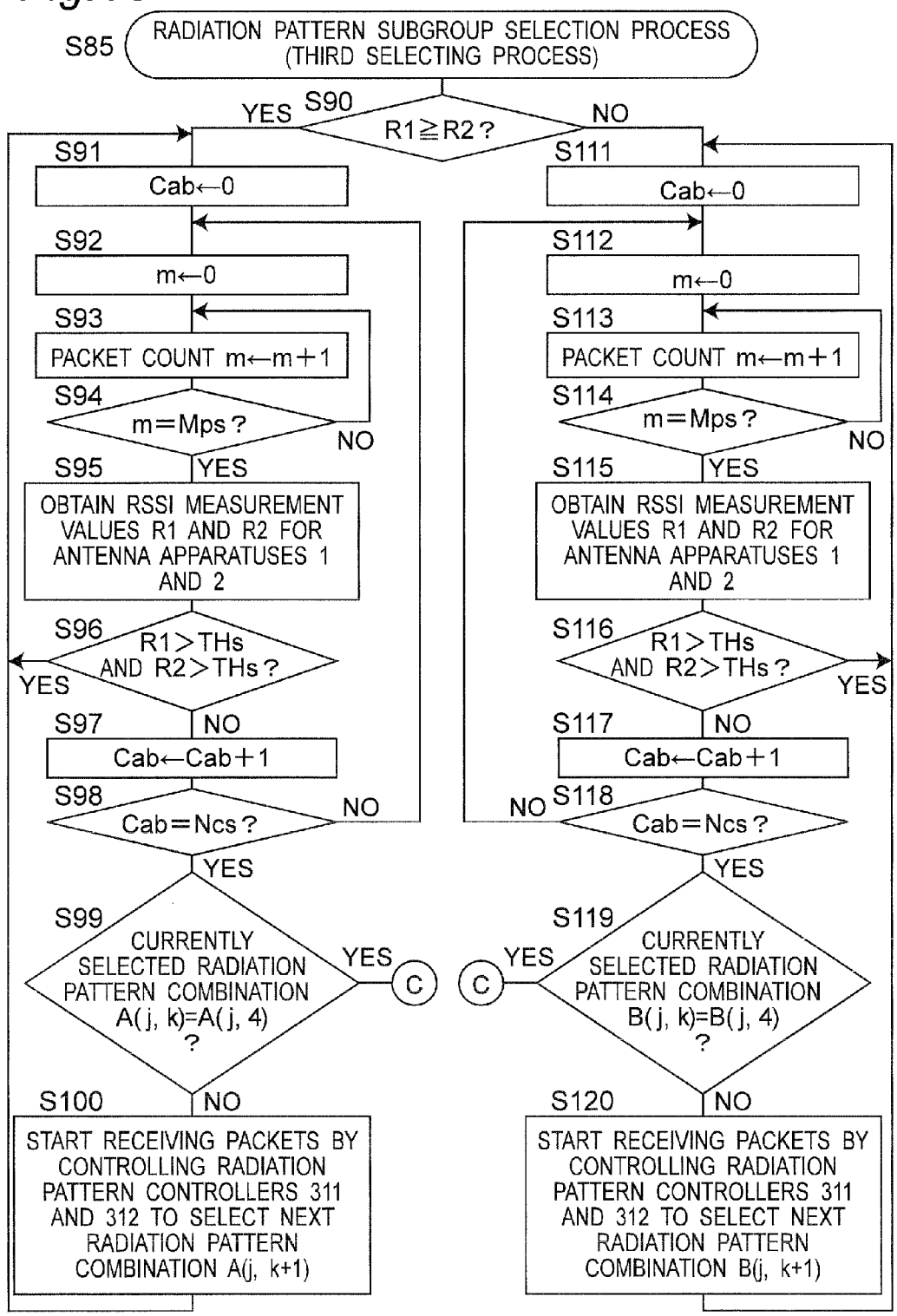
FIG. 18 is a flow chart showing a radiation pattern subgroup selection process of step S85 of FIG. 17.

The radiation pattern group selection process of FIG. 17 is referred to as a second selection process. As described above, the second selection process includes measuring the RSSI measurement values R1 and R2 every selected setting value of the detection packet interval Mpg of the RSSI measurement values R1 and R2, when the controller 301 selects one radiation pattern combination and controls the array antenna apparatuses 1 and 2 to be set to have the one radiation pattern combination. In addition, the second selection process includes:

(a) retaining the selected radiation pattern combination when the RSSI measurement values R1 and R2 are larger than the selected setting value of the changeover threshold received electric field THg, (b) selecting a radiation pattern combination included in a radiation pattern group other than the radiation pattern group that includes the selected radiation pattern combination with reference to the radiation pattern table T4, when the controller 301 successively detects by the selected setting value of the changeover threshold Ncg that the RSSI measurement values R1 and R2 are equal to or smaller than the selected setting value of the changeover threshold received electric field THg, and (c) by executing the radiation pattern subgroup selection process (third selection process) of FIG. 18, selecting a radiation pattern combination included in the radiation pattern group that includes the selected radiation pattern combination with reference to the radiation pattern table T4, when the controller 301 successively detects by the selected setting value of the changeover threshold Ncg that one of the RSSI measurement values R1 and R2 is equal to or smaller than the selected setting value of the changeover threshold received electric field THg.

Next, the radiation pattern subgroup selection process at step S85 of FIG. 17 is described. FIG. 18 is a flow chart showing the radiation pattern subgroup selection process at step S85 of FIG. 17. First of all, it is judged at step S90 whether or not the RSSI measurement value R1 is equal to or larger than the RSSI measurement value R2. If YES at step S90, then the control flow goes to step S91. On the other hand, if NO at step S90, then the control flow goes to step S111. At step S91, a number of times Cab is initialized to zero, and the packet count m is initialized to zero at step S92. Then, one is added to a packet count m at the time of receiving packets at step S93, and it is judged at step S94 whether or not the packet count m is equal to the detection packet interval Mps. If NO at step S94, then the control flow returns to step S93. On the other hand, if YES at step S94, then the control flow goes to step S95. Then, at step S95, the controller 301 obtains the RSSI measurement values R1 and R2 for the wireless signals received by the antenna apparatuses 1 and 2.

Next, it is judged at step S96 whether or not the RSSI measurement values R1 and R2 are larger than the changeover threshold received electric field THs. If YES at step S96, then the control flow returns to step S91. On the other hand, if NO at step S96, then the control flow goes to step S97, and one is added to the number of times Cab. Subsequently to step S97, it is judged at step S98 whether or not the number of times Cab is equal to the changeover threshold Ncs. If NO at step S98, then the control flow returns to step S92. On the other hand, if YES at step S98, then the control flow goes to step S99. It is judged at step S99 whether or not the currently selected radiation pattern combination A(j,k) is the radiation pattern combination A(j,4). If YES at step S99, then the control flow returns to step S51 of FIG. 16. On the other hand, if NO at step S99, then the control flow goes to step S100. Then, at step S100, the controller 301 controls the radiation pattern controllers 311 and 312 to select the next radiation pattern combination A(j,k+1) with reference to the radiation pattern table T4, and controls the wireless communication circuit 204 to start receiving packets. Then, the control flow returns to step S91.

If NO at step S90, then the number of times Cab is initialized to zero at step S111, and the packet count m is initialized to zero at step S112. Then, one is added to the packet count m at the time of receiving packets at step S113, and it is judged at step S114 whether or not the packet count m is equal to the detection packet interval Mps. If NO at step S114, then the control flow returns to step S113. On the other hand, if YES at step S114, then the control flow goes to step S115. Then, at step S115, the controller 301 obtains the RSSI measurement values R1 and R2 for the wireless signals received by the antenna apparatuses 1 and 2.

Next, it is judged at step S116 whether or not the RSSI measurement values R1 and R2 are larger than the changeover threshold received electric field THs. If YES at step S116, then the control flow returns to step S111. On the other hand, if NO at step S116, then the control flow goes to step S117, and one is added to the number of times Cab. Subsequently to step S117, it is judged at step S118 whether or not the number of times Cab is equal to the changeover threshold Ncs. If NO at step S118, then the control flow returns to step S112. On the other hand, if YES at step S118, then the control flow goes to step S119. It is judged at step S119 whether or not the currently selected radiation pattern combination B(j,k) is the radiation pattern combination B(j,4). If YES at step S119, then the control flow returns to step S51 of FIG. 16. On the other hand, if NO at step S119, then the control flow goes to step S120. Then, at step S120, the controller 301 controls the radiation pattern controllers 311 and 312 to select the next radiation pattern combination B(j,k+1) with reference to the radiation pattern table T4, and controls the wireless communication circuit 204 to start receiving packets. Then, the control flow returns to step S111.

As described above, the radiation pattern subgroup selection process of FIG. 18 includes:

(c1) when the RSSI measurement value R1 is equal to or larger than the RSSI measurement value R2, selecting a radiation pattern combination A(j,k+1), which is included in the radiation pattern subgroup Aj that includes the currently selected radiation pattern combination A(j,k) and is different from the radiation pattern combination A(j,k), with reference to the radiation pattern table T4, and (c2) when the RSSI measurement value R1 is smaller than the RSSI measurement value R2, selecting a radiation pattern combination B(j,k+1), which is included in the radiation pattern subgroup Bj that includes the currently selected radiation pattern combination B(j,k) and is different from the radiation pattern combination B(j,k), with reference to the radiation pattern table T4.

Further, the radiation pattern subgroup selection process of FIG. 18 includes measuring the RSSI measurement values R1 and R2 every selected setting value of the detection packet intervals Mps of the RSSI measurement values R1 and R2, and selecting the radiation pattern combination A(j,k) or B(j, k), when the controller 301 successively detects by the selected setting value of the changeover threshold Ncs that at least one of the measurement values of the measured RSSI measurement values R1 and R2 is equal to or smaller than the selected setting value of the changeover threshold received electric field THs.

Therefore, in the radiation pattern subgroup selection process of FIG. 18, when the RSSI measurement value R1 is equal to or larger than the RSSI measurement value R2, the RSSI measurement values R1 and R2 are obtained at the detection packet interval Mps by using the radiation pattern combination A(j,k) included in the currently selected radiation pattern group Gj at steps S91 to S100. When it is detected by the changeover threshold Ncs that at least one of the RSSI measurement values R1 and R2 is smaller than the changeover threshold received electric field THs, the next radiation pattern combination A(j,k) is selected. Namely, as shown in FIG. 14, the radiation pattern of the array antenna apparatus 2 is changed without changing the radiation pattern of the array antenna apparatus 1. On the other hand, when the RSSI measurement value R1 is smaller than the RSSI measurement value R2, the RSSI measurement values R1 and R2 are obtained at the detection packet interval Mps by using the radiation pattern combination B(j,k) included in the currently selected radiation pattern group Gj at steps S111 to S120. When it is detected by the changeover threshold Ncs that at least one of the RSSI measurement values R1 and R2 is smaller than the changeover threshold received electric field THs, the next radiation pattern combination B(j,k) is selected. Namely, as shown in FIG. 14, the radiation pattern of the array antenna apparatus 1 is changed without changing the radiation pattern of the array antenna apparatus 2.

In addition, as shown in FIG. 15, the changeover threshold received electric field THs, the changeover threshold Ncs and the detection packet interval Mps used in the radiation pattern subgroup selection process of FIG. 18 are set smaller than the changeover threshold received electric field THg, the changeover threshold Ncg and the detection packet interval Mpg used in the radiation pattern group selection process of FIG. 17, respectively. Therefore, the interval of change in the radiation pattern combination in each radiation pattern subgroup becomes smaller than the interval of change in the radiation pattern group in the radiation pattern group selection process.

As described above in detail, according to the present preferred embodiment, when the controller 301 selects the radiation pattern combination A(1,1) from among the plurality of radiation patterns of the array antenna apparatus 1 and the plurality of radiation patterns of the array antenna apparatus 2 and controls the array antenna apparatuses 1 and 2 to be set to have the radiation pattern combination A(1,1), the controller 301 measures RSSI measurement values R1 and R2, and calculates the electric field parameter Rmax based on the measured RSSI measurement values R1 and R2. By using the first selection process of FIG. 16, the controller 301 selects the setting values of the selection process parameters THg, Ncg, Mpg, THs and Mps with reference to the radiation pattern selection process parameter table T5 based on the calculated electric field parameter Rmax. By using the second selection process of FIG. 17, the controller 301 selects one combination from among the plurality of radiation pattern combinations based on the setting values of the selected selection process parameters THg, Ncg, Mpg, THs and Mps. The controller 301 controls the array antenna apparatuses 1 and 2 to be set to have the selected radiation pattern combination. Therefore, unnecessary antenna control can be suppressed by reducing the number of times of the changeover of the respective radiation patterns of the array antenna apparatuses 1 and 2 as compared with the prior art. For the above reasons, the radiation patterns of the array antenna apparatuses 1 and 2 can be changed efficiently according to variation in the radio wave propagation environment as compared with the prior art. In particular, when it is judged that the electric field is intense at step S53 of the radiation pattern selection process of FIG. 16, the changeover threshold received electric field THg larger than in the case where the electric field is weak is used, and therefore, the radiation pattern group can be selected efficiently regardless of the strength of the electric field intensity as compared with the prior art.

Further, when, for example, a plurality of wireless communication apparatuses 300 are installed in an aircraft, the radio wave propagation environment at the respective wireless communication apparatus 300 are different from each others. However, according to the present preferred embodiment, a common radiation pattern selection process program can be used at these plurality of wireless communication apparatuses 300. Therefore, a common wireless LAN module and the common software can be used for a plurality of wireless communication apparatuses 300. In addition, the parameters (changeover threshold received electric field THg, changeover threshold Ncg, detection packet interval Mpg, changeover threshold received electric field THs, changeover threshold Ncs, and detection packet interval Mps) for the radiation pattern selection process are not required to be adjusted in each wireless communication apparatus 300, and therefore, the development period of the wireless communication apparatus 300 can be shortened than that of the prior art.

Although the parameters THg, Nc, Mpg, THs, Ncs and Mps for the radiation pattern selection process have respective two setting values as shown in FIG. 15 in the present preferred embodiment, however, the present invention is not limited to this. Each of the parameters THg, Nc, Mpg, THs, Ncs and Mps may have a plurality of three or more setting values.

In addition, the antenna selection process of the first preferred embodiment may be executed in the wireless communication apparatus 300 of the present preferred embodiment. In this case, it is proper to use a table that shows relations between sixteen radiation pattern combinations and the radiation patterns of the array antenna apparatus 1 and the radiation patterns of the array antenna apparatus 2 selected in each radiation pattern combination in place of the antenna combination table T3 of FIG. 7.

In addition, the RSSI is measured in each of the above preferred embodiments, however, the present invention is not limited to this. It is proper to measure a value, such as an error vector magnitude (Error Vector Magnitude; EVM), that represents the received signal level of the received wireless signal.

Still further, the client apparatus 200 and the wireless communication apparatus 300 are the wireless communication apparatuses of the 2×2 MIMO transmission system conforming to the wireless LAN communication standard IEEE802.11n in each of the aforementioned preferred embodiments, however, the present invention is not limited to this. The client apparatus 200 and the wireless communication apparatus 300 may be wireless communication apparatuses such as portable telephones conforming to another wireless communication standard.

Industrial Applicability

As described above in detail, according to the wireless communication apparatus of the first the present invention, when the control means sets the first and second antenna apparatuses to have predetermined radiation patterns, respectively, the control means measures a first received signal level of a wireless signal received by the first antenna apparatus and a second received signal level of a wireless signal received by the second antenna apparatus. Based on measured first and second received signal levels, the control means sets a detection time interval of received electric field at the wireless communication apparatus so that the detection time interval decreases with an increase in the received electric field and increases with an increase in a time-lapse change in the received electric field, and sets a changeover threshold of each of the radiation patterns so that the changeover threshold decreases with the increase in the received electric field and increases with the increase in the time-lapse change in the received electric field. Therefore, it is possible to change the radiation patterns of the plurality of antenna apparatuses according to variation in the radio wave propagation environment more efficiently than the prior art.

In addition, according to the wireless communication apparatus of the second the present invention, the control means sets the first and second antenna apparatuses to have predetermined radiation patterns, respectively, the control means measures a first received signal level of a wireless signal received by the first antenna apparatus and a second received signal level of a wireless signal received by the second antenna apparatus. Based on measured first and second received signal levels, the control means sets a first changeover threshold received electric field for each of the radiation patterns so that the first changeover threshold received electric field increases with an increase in received electric field at the wireless communication apparatus. Therefore, it is possible to change the radiation patterns of the plurality of antenna apparatuses according to variation in the radio wave propagation environment more efficiently than the prior art.

REFERENCE SIGNS LIST 1 and 2 . . . array antenna apparatus;
1$f$ and 2$f$ . . . feed antenna element;
1$a$, 1$b$, 2$a$, and 2$b$ . . . parasitic element;
1P and 2P . . . antenna apparatus;
1$h$, 1$v$, 2$h$, and 2$v$ . . . antenna element;
100 . . . host apparatus;

100m . . . memory;
200 . . . client apparatus;
201 and 301 . . . controller;
202 and 302 . . . ROM;
203 . . . flash memory;
204 . . . wireless communication circuit;
206 . . . interface;
210 . . . bus;
300 . . . wireless communication apparatus;
303 . . . RAM;
306 . . . USB interface;
307 . . . USB connector;
311 and 312 . . . radiation pattern controller;
SW1 and SW2 . . . switch;
T1 . . . detection packet interval table;
T2 . . . changeover threshold table;
T3 . . . antenna combination table;
T4 . . . radiation pattern table; and
T5 . . . radiation pattern selection process parameter table.

The invention claimed is:

1. A wireless communication apparatus, comprising:
a first antenna apparatus that has a plurality of first radiation patterns different from each other;
a second antenna apparatus that has a plurality of second radiation patterns different from each other; and
a controller that sets radiation patterns of the first and second antenna apparatuses by changing over the radiation patterns of the first and second antenna apparatuses, respectively,
wherein, when the controller sets the first and second antenna apparatuses to have predetermined radiation patterns, respectively, the controller measures a first received signal level of a wireless signal received by the first antenna apparatus and a second received signal level of a wireless signal received by the second antenna apparatus,
wherein, based on measured first and second received signal levels, the controller sets a detection time interval of received electric field at the wireless communication apparatus so that the detection time interval decreases with an increase in the received electric field and increases with an increase in a time-lapse change in the received electric field, and sets a changeover threshold of each of the radiation patterns so that the changeover threshold decreases with the increase in the received electric field and increases with the increase in the time-lapse change in the received electric field, and
wherein the controller calculates a linear combined value of the first and second received signal levels every set detection time interval, and controls the first and second antenna apparatus to have a further radiation pattern combination when the controller successively detects by a set changeover threshold that a calculated linear combined value is equal to or smaller than a predetermined value.

2. The wireless communication apparatus as claimed in claim 1,
wherein the wireless communication apparatus further comprises a storage unit that previously stores a first table that includes setting values of the detection time interval to change in the received electric field and change in the time-lapse change in the received electric field, and a second table that includes setting values of the changeover threshold to the change in the received electric field and the change in the time-lapse change in the received electric field,
wherein the received electric field is a sum total of measurement values when the controller simultaneously measures the first and second received signal levels by a predetermined first number of times,
wherein the time-lapse change in the received electric field is an absolute value of a difference between a sum total of measurement values when the controller simultaneously measures the first and second received signal levels by a predetermined second number of times, and a sum total of measurement values when the controller simultaneously further measures the first and second received signal levels by the predetermined second number of times, and
wherein the controller measures the first and second received signal levels when the controller set the first and second antenna apparatuses to have the predetermined radiation patterns, respectively,
wherein the controller calculates the received electric field and the time-lapse change in the received electric field based on measured first and second received signal levels, and
wherein, based on calculated values of the received electric field and the time-lapse change in the received electric field, the controller sets the detection time interval with reference to the first table, and sets the changeover threshold with reference to the second table.

3. The wireless communication apparatus as claimed in claim 2,
wherein the linear combined value is an average value of the measurement values of the first and second received signal levels.

4. The wireless communication apparatus as claimed in claim 1,
wherein the first antenna apparatus comprises:
a plurality of first antenna elements that has a plurality of respective first radiation patterns that are different from each other, respectively; and
a first switch that selects one antenna element from among the plurality of first antenna elements by selectively changing over a selected first antenna element, and
wherein the second antenna apparatus comprises:
a plurality of second antenna elements having a plurality of respective second radiation patterns that are different from each other, respectively; and
a second switch for selecting one antenna element from among the plurality of second antenna elements by selectively changing over a selected second antenna element.

5. The wireless communication apparatus as claimed in claim 1,
wherein the first antenna apparatus comprises:
a first feed element;
two first parasitic elements that are provided in proximity to the first feed element so as to be electromagnetically coupled to the first feed element; and
first radiation pattern controller that selects one radiation pattern from among the plurality of first radiation patterns different from each other by changing over a selected first radiation pattern by changing over whether or not to operate the first parasitic elements as reflectors, respectively,
wherein the second antenna apparatus comprises:
a second feed element,
two second parasitic elements that are provided in proximity to the second feed element so as to be electromagnetically coupled to the second feed element; and
second radiation pattern controller that selects one radiation pattern from among the plurality of second radiation patterns different from each other by changing over a selected second radiation pattern by changing over whether or not to operate the second parasitic elements as reflectors, respectively.

6. A wireless communication apparatus, comprising:
a first antenna apparatus that has a plurality of first radiation patterns different from each other;
a second antenna apparatus that has a plurality of second radiation patterns different from each other; and
a controller that sets radiation patterns of the first and second antenna apparatuses by changing over the radiation patterns of the first and second antenna apparatuses, respectively,
wherein, when the controller sets the first and second antenna apparatuses to have predetermined radiation patterns, respectively, the controller measures a first received signal level of a wireless signal received by the first antenna apparatus and a second received signal level of a wireless signal received by the second antenna apparatus,
wherein, based on measured first and second received signal levels, the controller sets a first changeover threshold received electric field for each of the radiation patterns so that the first changeover threshold received electric field increases with an increase in received electric field at the wireless communication apparatus, and
wherein the controller measures the first and second received signal levels every predetermined first detection time interval, and controls the first and second antenna apparatus to have a further radiation pattern combination when the controller successively detects by a predetermined first changeover threshold that at least one of measured first and second received signal levels is equal to or smaller than a set first changeover threshold received electric field.

7. The wireless communication apparatus as claimed in claim 6,
wherein the wireless communication apparatus further comprises a storage unit that previously stores:
(a) a first table including setting values of the first changeover threshold received electric field to change in the received electric field; and
(b) a second table configured by classifying a plurality of radiation pattern combinations of the plurality of first radiation patterns and the plurality of second radiation patterns into a plurality of radiation pattern groups considering directivity characteristics of combined radiation patterns,
wherein the received electric field is a larger measurement value of simultaneously measured measurement values of the first and second received signal levels,
wherein the controller calculates the received electric field based on measured first and second received signal levels when the controller sets the first and second antenna apparatuses to have the predetermined radiation patterns, respectively, and sets the first changeover threshold received electric field with reference to the first table based on a calculated value of the received electric field, and
wherein, when the controller selects one combination of the plurality of combinations of radiation patterns and controls the first and second antenna apparatuses to be set to have the one combination, the controller measures the first and second received signal levels every first detection time interval, and
wherein the controller
(a) retains a selected radiation pattern combination;
(b) selects a predetermined radiation pattern combination, which is included in a radiation pattern group other than a radiation pattern group that includes the selected radiation pattern combination, with reference to the second table, when the controller successively detects by the first changeover threshold that the measured first and second received signal levels are equal to or smaller than the set first changeover threshold received electric field; and
(c) by executing a predetermined selection process, selects a further radiation pattern combination, which is included in the radiation pattern group that includes the selected radiation pattern combination, with reference to the second table, when the controller successively detects by the first changeover threshold that one of the measured first and second received signal levels is smaller than the first changeover threshold received electric field.

8. The wireless communication apparatus as claimed in claim 7,
wherein each of the radiation pattern groups includes first and second radiation pattern subgroups,
wherein, in each of the radiation pattern groups, first radiation patterns included in the radiation pattern combinations included in the first radiation pattern subgroup are the same as each other, and second radiation patterns included in the radiation pattern combinations included in the first radiation pattern subgroup are different from each other,
wherein, in each of the radiation pattern groups, first radiation patterns included in the radiation pattern combinations included in the second radiation pattern subgroup are different from each other, and second radiation patterns included in the radiation pattern combinations included in the second radiation pattern subgroup are the same as each other, and
wherein the selection process includes:
(c1) when the measured first received signal level is equal to or larger than the second received signal level, selecting a first radiation pattern combination, which is included in the first radiation pattern subgroup that includes the selected radiation pattern combination and is different from the selected radiation pattern combination, with reference to the second table; and
(c2) when the measured first received signal level is smaller than the second received signal level, selecting a second radiation pattern combination, which is included in the second radiation pattern subgroup that includes the selected radiation pattern combination and is different from the selected radiation pattern combination, with reference to the second table.

9. The wireless communication apparatus as claimed in claim 8,
wherein the first table further includes setting values of the second changeover threshold received electric field to the change in the received electric field,
wherein, when the controller sets the first changeover threshold received electric field with reference to the first table, the controller further sets the second changeover threshold received electric field with reference to the first table, based on the calculated received electric field,
wherein the selection process includes measuring the first and second received signal levels every predetermined second detection time interval, and selecting the first or second radiation pattern combination when the controller successively detects by a predetermined second changeover threshold that at least one of measured first and second received signal levels is equal to or smaller than a set second changeover threshold received electric field.

10. The wireless communication apparatus as claimed in claim 9, wherein, in the first table, the plurality of setting values of the first changeover threshold received electric field are set to increase with an increase in the received electric field, the plurality of setting values of the second changeover threshold received electric field are set to increase with the increase in the received electric field, and the setting values of the first changeover threshold received electric field are set to values larger than the setting values of corresponding second changeover threshold received electric field, respectively, wherein the first changeover threshold is set to have a value smaller than the second changeover threshold, and wherein the first detection time interval is set to have a value smaller than the second detection time interval.

11. The wireless communication apparatus as claimed in claim 6, wherein the first antenna apparatus comprises:

a plurality of first antenna elements that has a plurality of respective first radiation patterns that are different from each other, respectively; and a first switch that selects one antenna element from among the plurality of first antenna elements by selectively changing over a selected first antenna element, and wherein the second antenna apparatus comprises:

a plurality of second antenna elements having a plurality of respective second radiation patterns that are different from each other, respectively; and a second switch for selecting one antenna element from among the plurality of second antenna elements by selectively changing over a selected second antenna element.

12. The wireless communication apparatus as claimed in claim 6, wherein the first antenna apparatus comprises:

a first feed element;

two first parasitic elements that are provided in proximity to the first feed element so as to be electromagnetically coupled to the first feed element; and first radiation pattern controller that selects one radiation pattern from among the plurality of first radiation patterns different from each other by changing over a selected first radiation pattern by changing over whether or not to operate the first parasitic elements as reflectors, respectively, wherein the second antenna apparatus comprises:

a second feed element, two second parasitic elements that are provided in proximity to the second feed element so as to be electromagnetically coupled to the second feed element; and second radiation pattern controller that selects one radiation pattern from among the plurality of second radiation patterns different from each other by changing over a selected second radiation pattern by changing over whether or not to operate the second parasitic elements as reflectors, respectively.

* * * * *